INVENTOR.
HENRY V. BORST
BY
Bauer and Seymour
ATTORNEYS

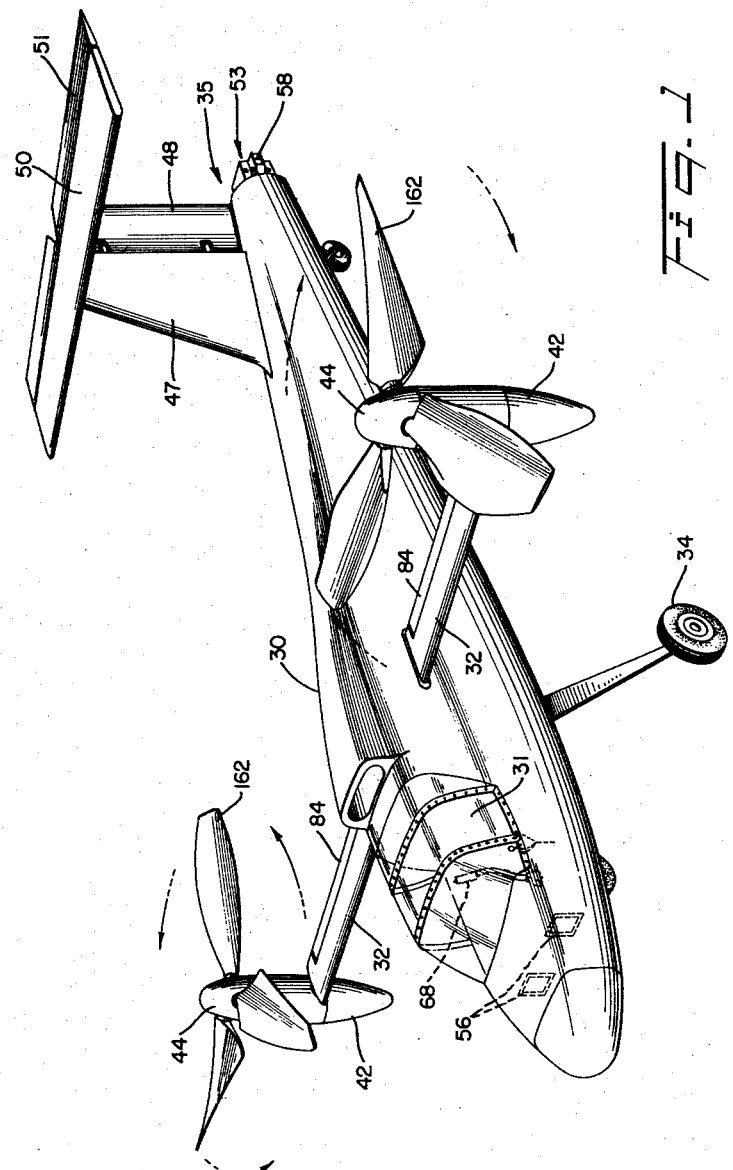

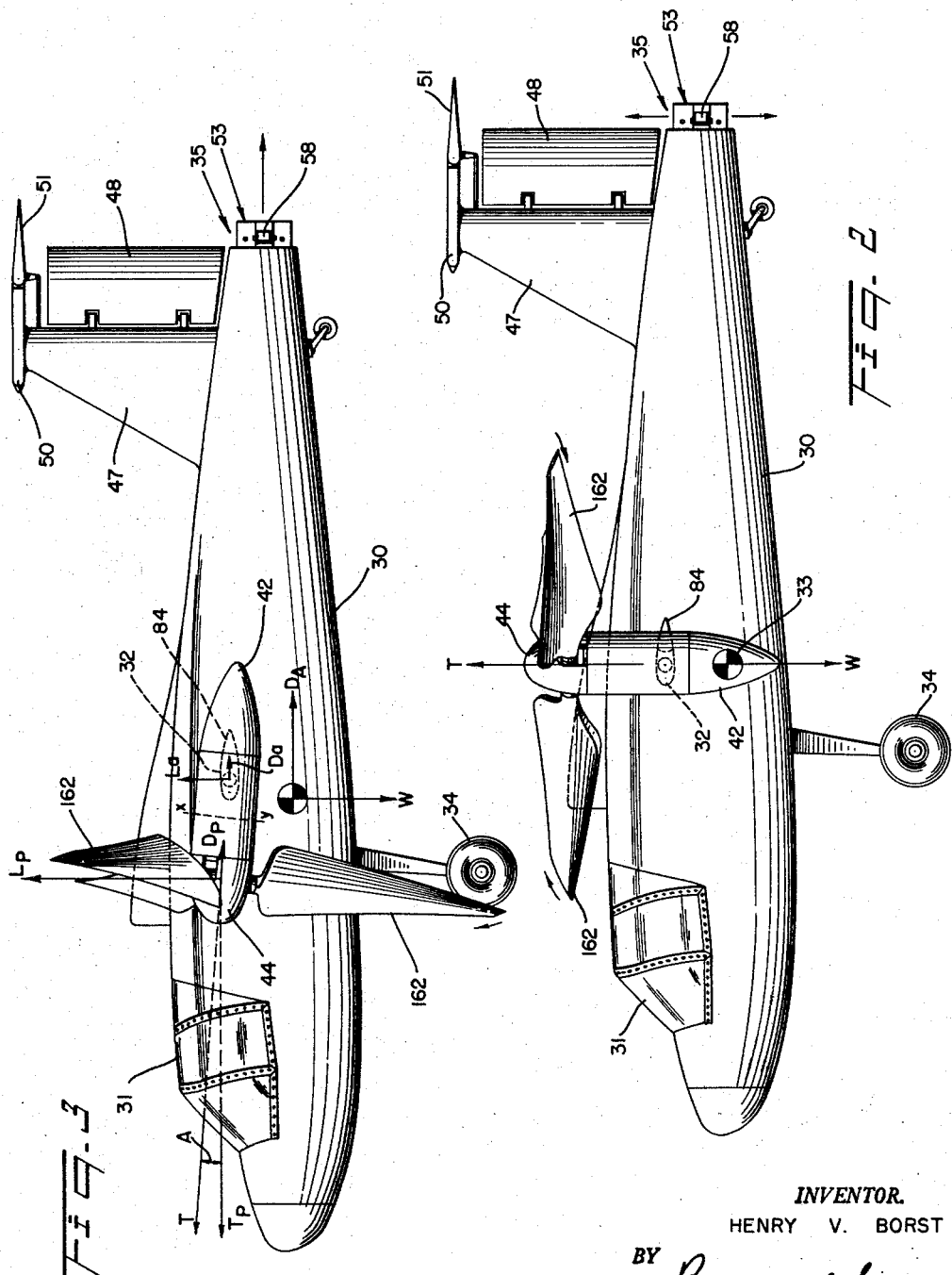

INVENTOR.
HENRY V. BORST
BY Bauer and Seymour
ATTORNEYS

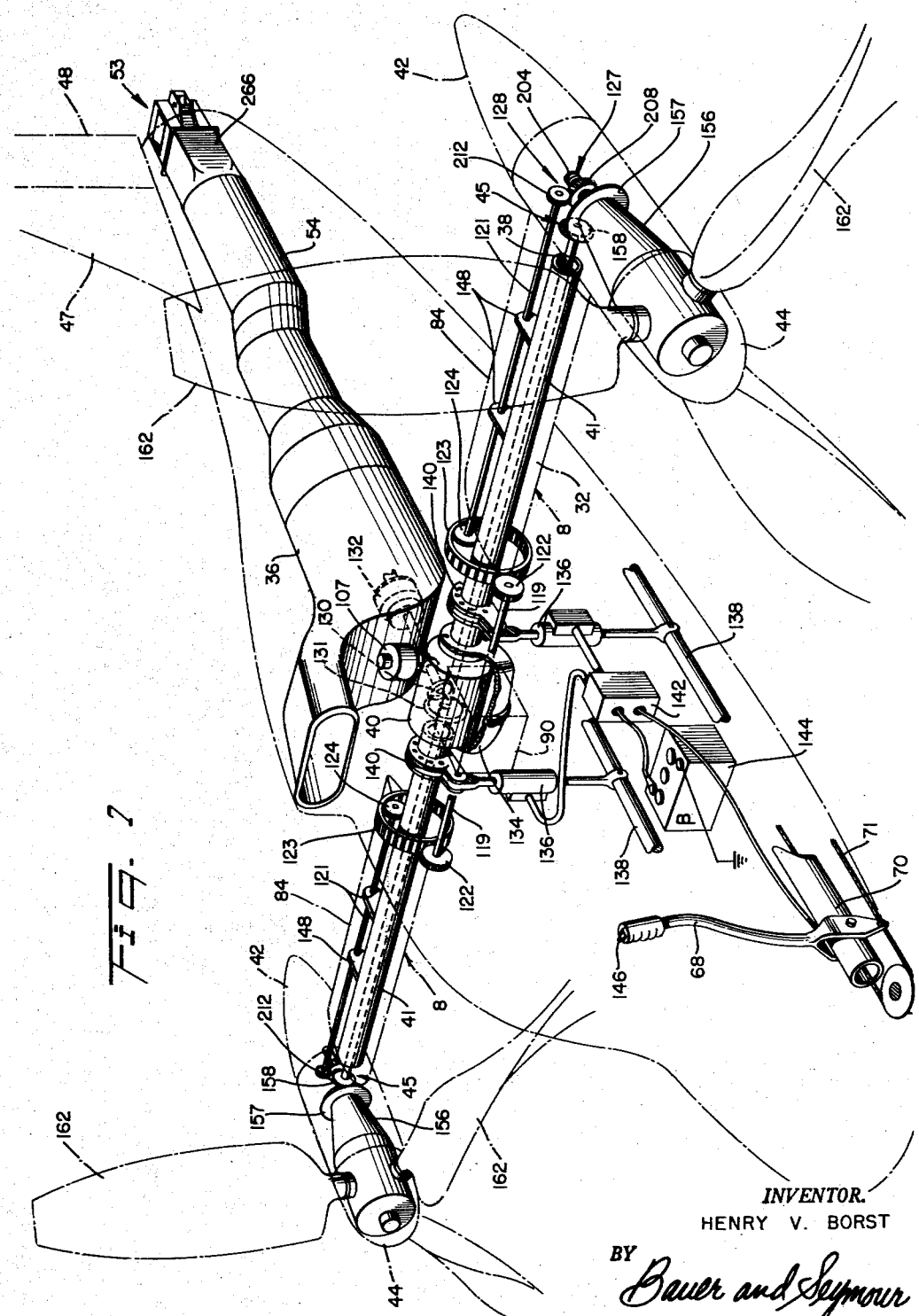

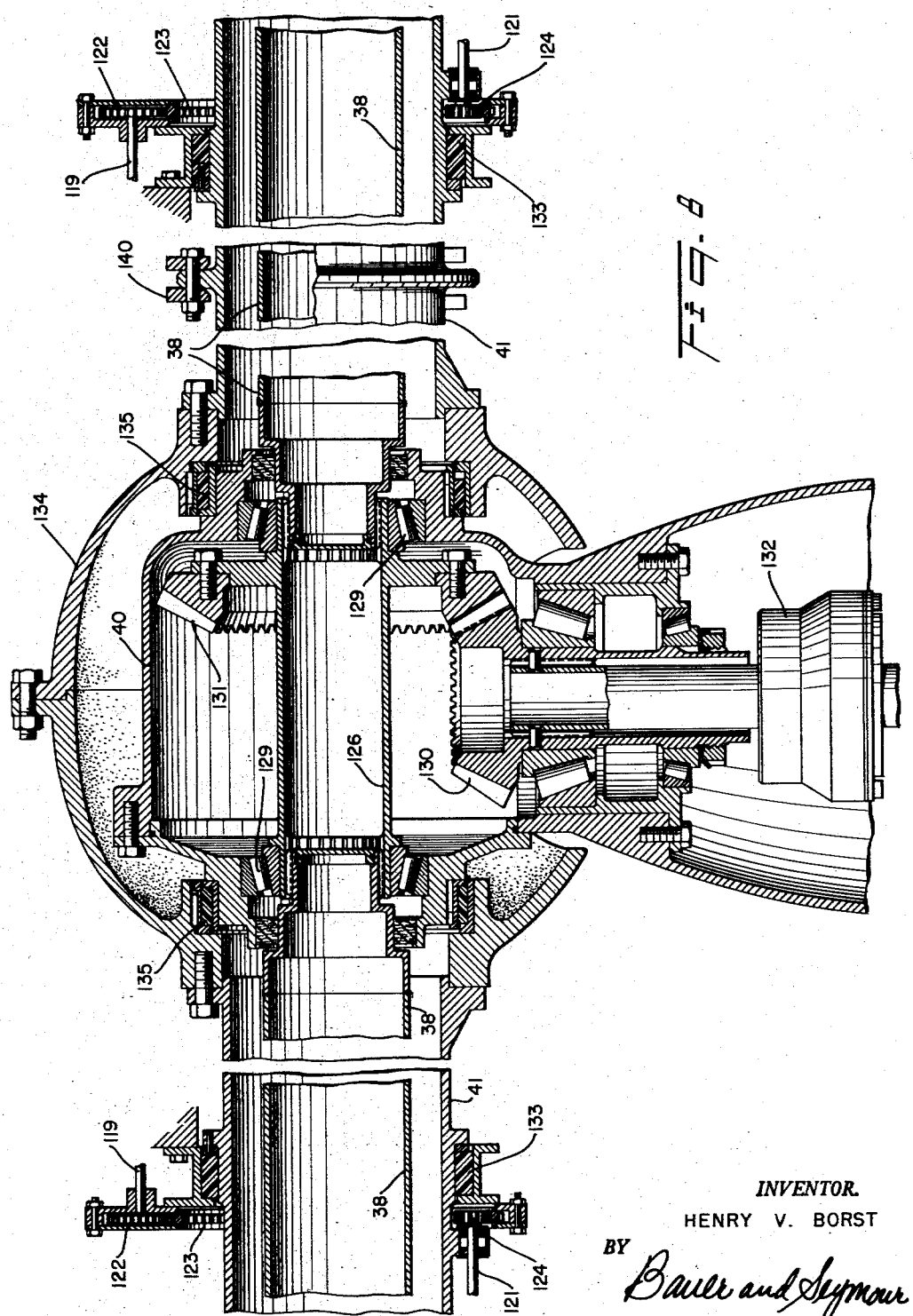

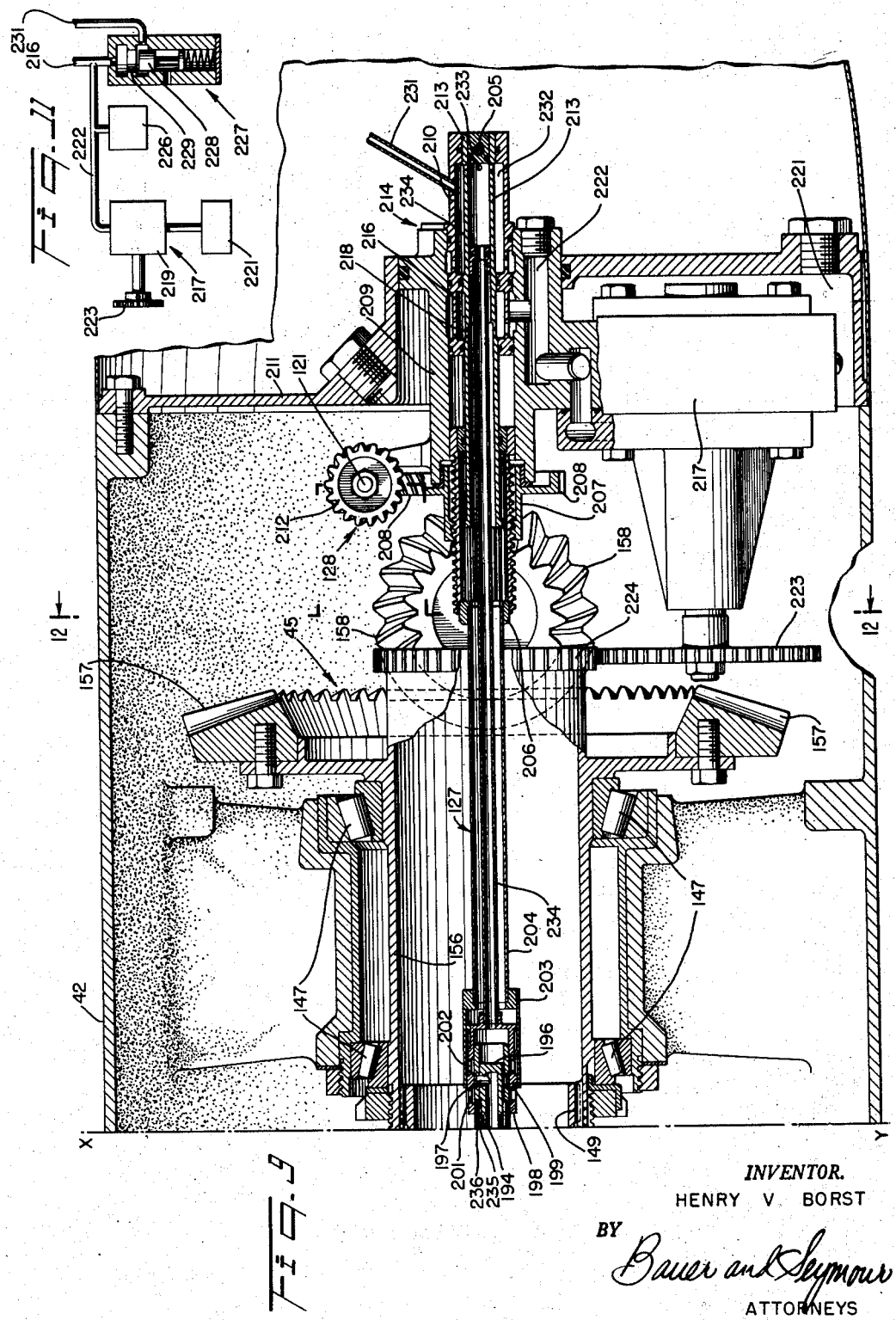

INVENTOR.
HENRY V. BORST
BY
Bauer and Seymour
ATTORNEYS

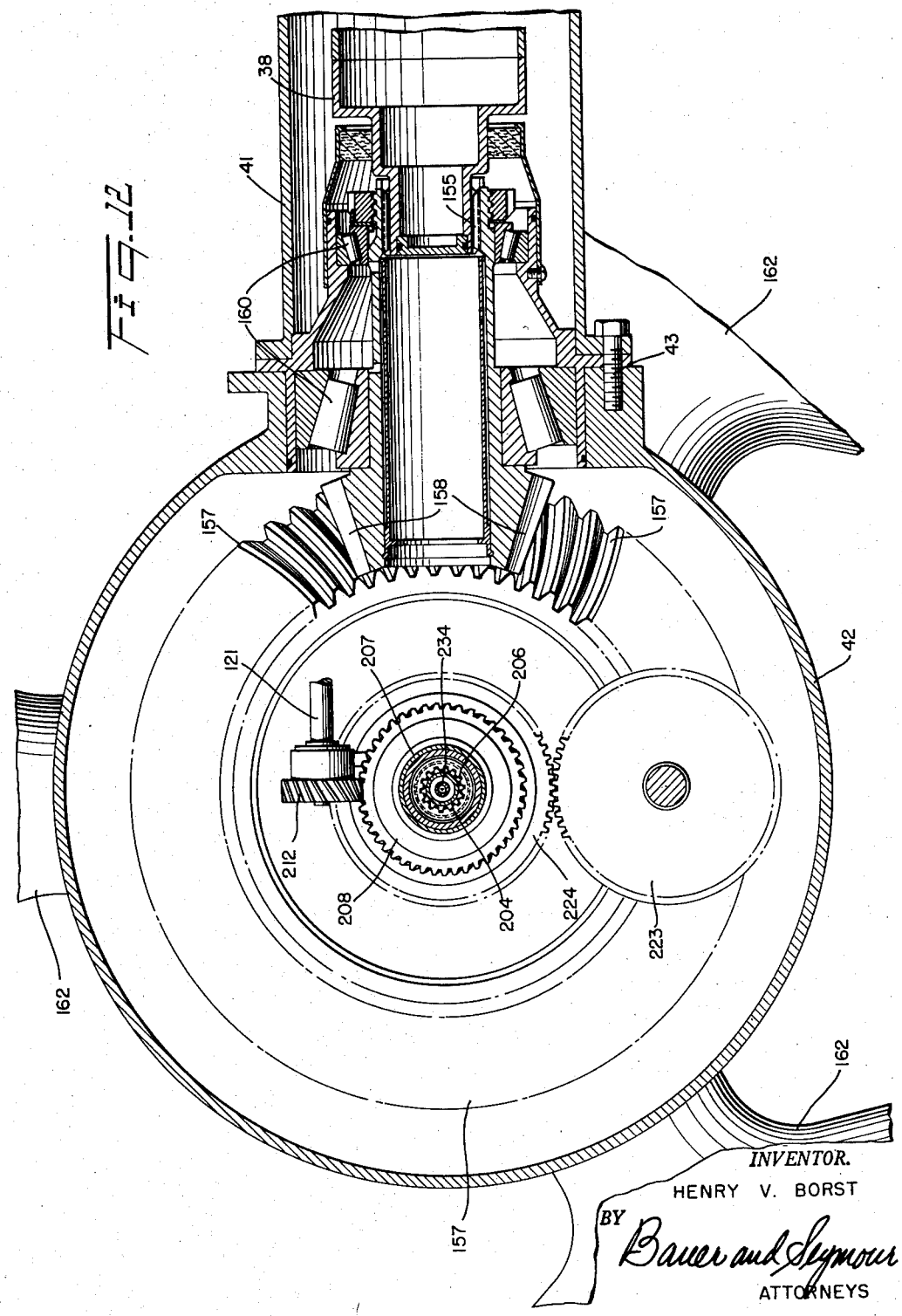

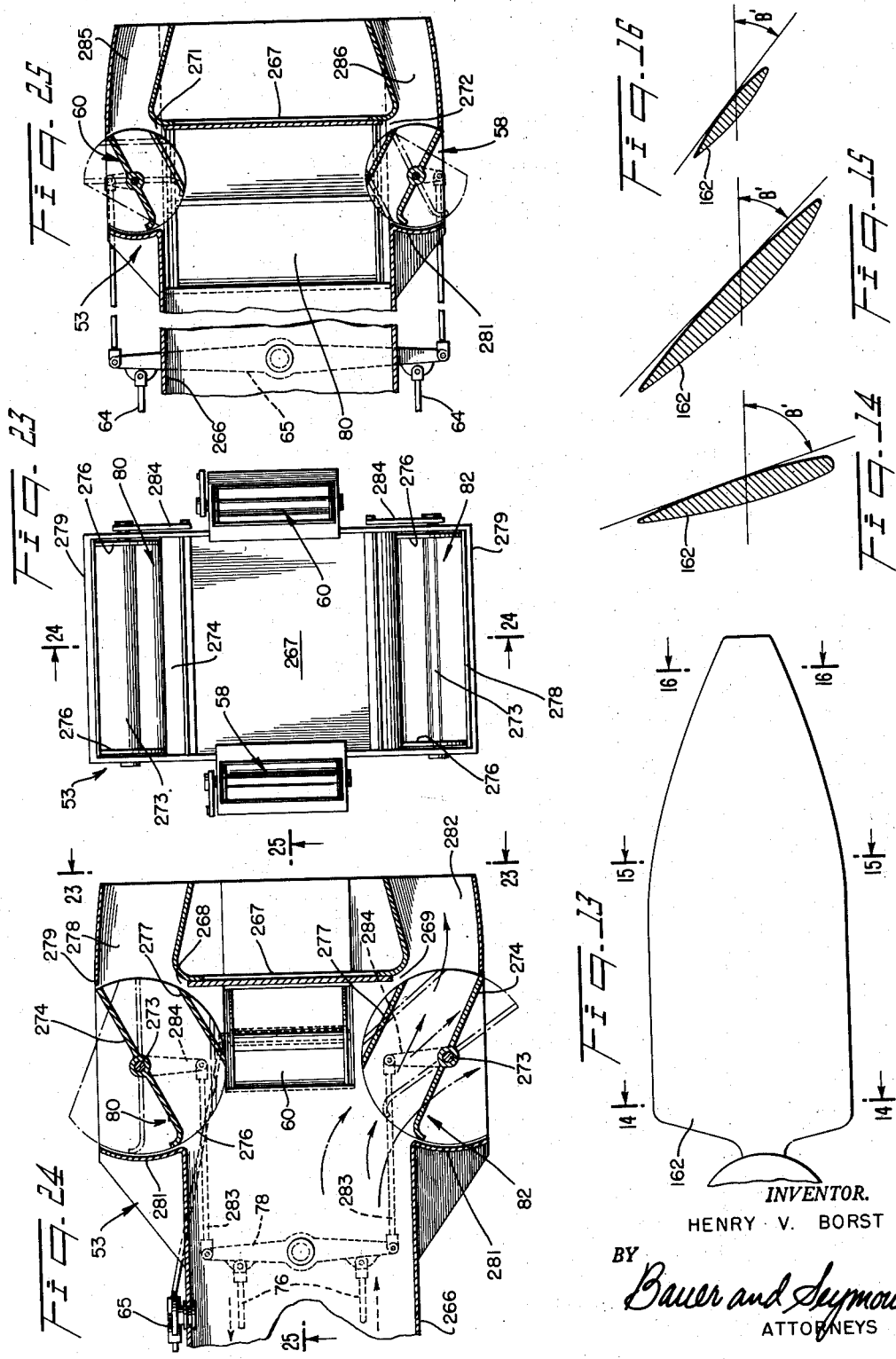

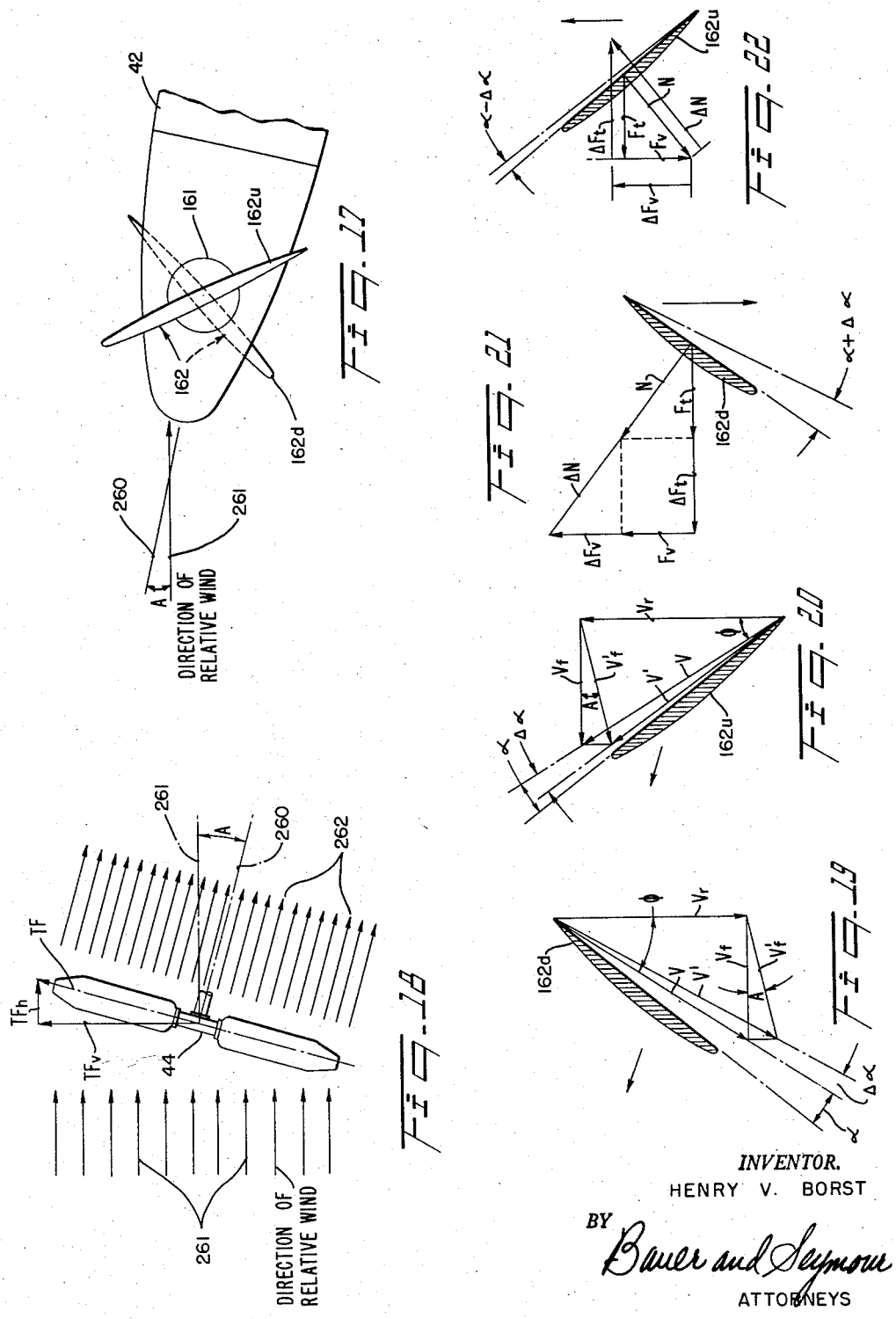

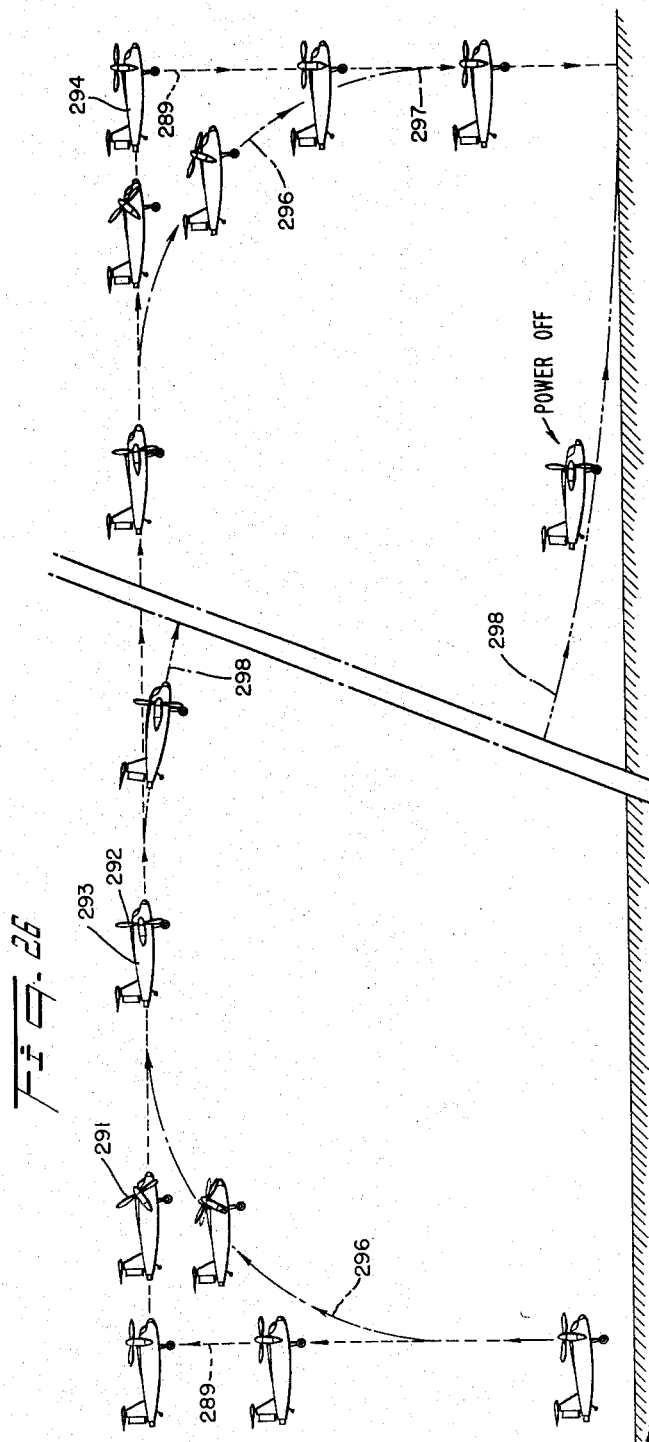
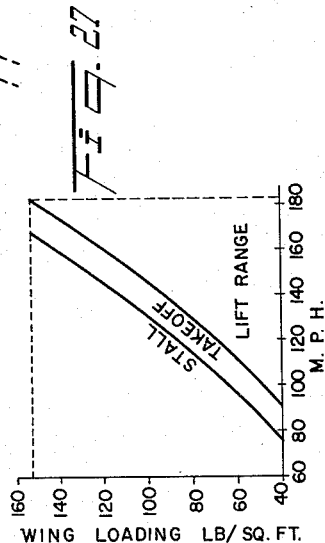
Fig. 26
Fig. 27
Fig. 28
INVENTOR.
HENRY V. BORST

United States Patent Office 3,106,369
Patented Oct. 8, 1963

3,106,369
AIRCRAFT AND METHOD OF OPERATING SAME
Henry V. Borst, Caldwell, N.J., assignor to Curtiss-Wright Corporation, a corporation of Delaware
Filed Feb. 23, 1960, Ser. No. 10,260
39 Claims. (Cl. 244—7)

This invention relates to air-borne vehicles and more particularly to aircraft which are especially adapted for commercial uses and relatively short range economical operation.

A primary object of the invention is to provide a novel, commercial type aircraft which may be safely launched from and landed on a small area with little or no forward speed and which has high sub-sonic forward speed capabilities when air-borne.

Another object is to provide a novelly constructed aircraft embodying a propeller system which functions in a novel manner to obviate the necessity of providing wings for sustaining the aircraft in horizontal or forward flight.

The novel aircraft contemplated by the invention is capable of vertical take-off and landing and, as compared to known aircraft of this type, is also capable of higher cruising speed in horizontal flight, whereby office-to-office transportation between widely separated cities or factories may be accomplished more rapidly and economically than by means of high speed jet type aircraft and the requisite supplemental surface transportation between airfields and offices. The proposed aircraft is generally of the type which is equipped with two or more propellers whose axes of rotation may be adjusted to a generally vertical position for vertical take-off and flight and for hovering, and may be tilted during flight between the vertical and a fore and aft nearly horizontal position for combined vertical and horizontal flight, and for transition from one to the other. Highest speed horizontal flight may be accomplished with the propeller axes in their nearly horizontal position, but at a positive, upwardly inclined angle to the direction of the relative wind.

One of the distinctive features of this invention lies in the use of a propeller induced vertical lifting force, herein sometimes called "radial lift force," as a dominant source for aircraft lift during part of the transition between vertical and horizontal flight. This lifting force which acts at right angles or radially with respect to the propeller axes may also be used as the sole or major lifting force during horizontal forward flight. During all flight modes involving either or both vertical and horizontal motion, the propellers furnish propulsive thrust acting in the direction of the propeller axes. During horizontal flight at the higher speed, small airfoils built into the aircraft primarly to minimize the drag of necessary parts may provide some lift to supplement said radial lift force and thereby increase the operating efficiency. These small airfoils are not and do not function as wings in the usual sense since they are ineffective to produce any appreciable lift at low and moderate horizontal flight speeds and are incapable of producing sufficient lift to sustain the craft at any speed attainable by the craft during transition of the propeller axes between vertical and nearly horizontal positions. Although the use of the small highly loaded airfoils is subordinate to the main novel concept of the invention, such use contributes to the advantages of weight reduction, increase in payload, and a considerably higher horizontal flight speed than is possible in prior known VTOL (vertical take-off and landing) aircraft.

The aircraft of the invention further includes novel means for effective pitch, yaw and roll control in all modes of flight and is safe for operation in all modes of flight within its capabilities, including transition in both directions between vertical and horizontal flight, and in power-off let-down and landing.

In known arrangements of VTOL aircraft which use the axial thrust of propellers for vertical lift and for horizontal propulsion, either fixed horizontal or tiltable wings are depended upon as the sole source of lift in horizontal flight at all speeds when the propeller axes are horizontal. The wings on such craft must be sufficiently large to sustain the aircraft at relatively low horizontal flight speeds. These relatively large wings result in necessary increases of weight and drag which seriously limit the high speed capability and the uses of the aircraft. In addition, the weight and drag of a large wing lifting system also limits the payload capacity. Due to these factors, prior VTOL aircraft oft his type have been inefficient and uneconomical.

It is accordingly a further object of the invention to provide a novelly constructed VTOL type, wingless aircraft wherein both the vertical lifting and forward propulsion functions are accomplished by propellers in a novel manner to permit both rapid ascent and high-speed horizontal flight with a maximum efficiency and a minimum of drag opposing motion in either the vertical or forward directions.

In those prior types of VTOL aircraft which use helicopter type articulated, cyclic pitch-change rotors or rotating wings for vertical lift, horizontal or forward propulsion by the rotor is extremely inefficient and the practical limit of forward speed is quite low. In the present invention the propellers have relatively rigid blades and are especially designed to provide high thrust under ascending, hovering and descending conditions, as encountered in vertical flight, and to also provide high efficiency and be economically highly loaded for forward propulsion during the horizontal flight mode. As stated previously, the propellers, when their axes are nearly horizontal, also provide the requisite force for aircraft lift through the constructive use of the phenomenon of propeller "radial lift force." This force, which will be explained further in detail, may also be called propeller normal force and propeller lateral force. It acts in the plane of rotation of the propeller normal to the propeller shaft and hence has resultant upward and rearward components under the operating conditions illustrated in FIG. 18. The generation of propeller radial force depends, among other factors, upon propeller design, upon forward speed, and upon the angle between the propeller shaft axis and the relative wind. Accordingly, in flight it becomes necessary to control this angle with reasonable precision, which angle is hereinafter called the angle A.

The powerplant for an aricraft embodying this invention may preferably comprise one or more light-weight internal combustion engines or turbines which are preferably capable of being individually or simultaneously connected to the propellers which may preferably be geared together so that they are driven in unison. Such engines or turbines afford further opportunity for increasing the disposable aircraft load and capability for securing longer range high-speed crusing capability of the craft.

Another object of the invention is to provide a novelly constructed aircraft capable of vertical take-off and landing and capable of transition from vertical flight or hovering to horizontal flight without loss of altitude.

Another object is to provide an aircraft having the above capabilities which is so novelly constructed and controllable as to greatly increase its stability and the ease of control at cruising speeds in comparison to known comparable types of aircraft, the novel features of said aircraft being such as to permit closer approach to conventional aircraft design in connection with factors contributing to stability.

Still another object is to provide novel means for driving a plurality of propellers in unison and novel means for controlling the blade pitch of said propellers, both differentially and collectively.

A further object is to provide novel means for mounting a propeller on an aircraft, whereby the axis of rotation thereof may be moved between vertical and horizontal positions, and novel means for effecting and controlling such movements thereof.

A still further object is to provide a novel method of operating an aircraft through the stages of take-off, forward flight and landing.

Another object is to provide a hovering type aircraft which is so novelly constructed as to be capable of higher forward speed than any such prior known aircraft having a power plant of comparable size and rating.

Another object is to provide novel means for controlling the attitude of vertically rising aircraft during take-off, hovering and low forward speed operation.

A further object is to provide an aircraft wherein lateral or roll control may be novelly effected by varying the blade pitch of a propeller.

Still another object is to provide novel apparatus and controls therefor whereby the exhaust of a turbine type engine or other source of gases under pressure is utilized in a novel manner to effect yaw and pitch control of an aircraft.

A still further object is to provide novel power transmitting means between a centrally located powerplant and a plurality of propellers symetrically disposed on an aircraft.

Another important object is to provide an aircraft propeller of novel form which is so constructed as to effectively and efficiently generate a substantial radial lift force and a substantial forward thrust simultaneously during forward horizontal flight of an aircraft.

It is also an object of the invention to provide an aircraft which is novelly constructed and operated to take optimum advantage of propeller radial lift force and airfoil lift force for sustaining the craft during forward horizontal flight.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the accompanying drawings wherein like reference characters refer to like arts throughout the several views, FIG. 1 is a perspective view of a typical aircraft according to the invention, shown with the propellers in position for vertical flight and hovering;

FIG. 2 is a side elevation of the aircraft with the propellers positioned for substantially vertical flight and hovering;

FIG. 3 is a side elevation of the aircraft with the propellers in position for substantially horizontal flight;

FIG. 7 is a diagram showing the power train to the propellers and the means by which the propeller axes are tilted or gimbaled between vertical and nearly horizontal attitudes;

FIG. 8 is a plan section of the central power gearing by which the laterally extending propeller drive shafts are driven from the powerplant, and of related mechanisms, the section being taken substantially on line 8—8 of FIG. 7;

FIGS. 9 and 10 are longitudinal vertical sections through rearward and forward parts, respectively, of a propeller nacelle, as divided by line X—Y of FIG. 3, the section being taken substantially along line 9—10 of FIG. 4;

FIG. 12 is a section on the line 12—12 of FIG. 9;

FIG. 13 is an elevation of the plan form of a novel type of propeller blade which may be used in carrying out the purpose of the invention;

Figure 4:
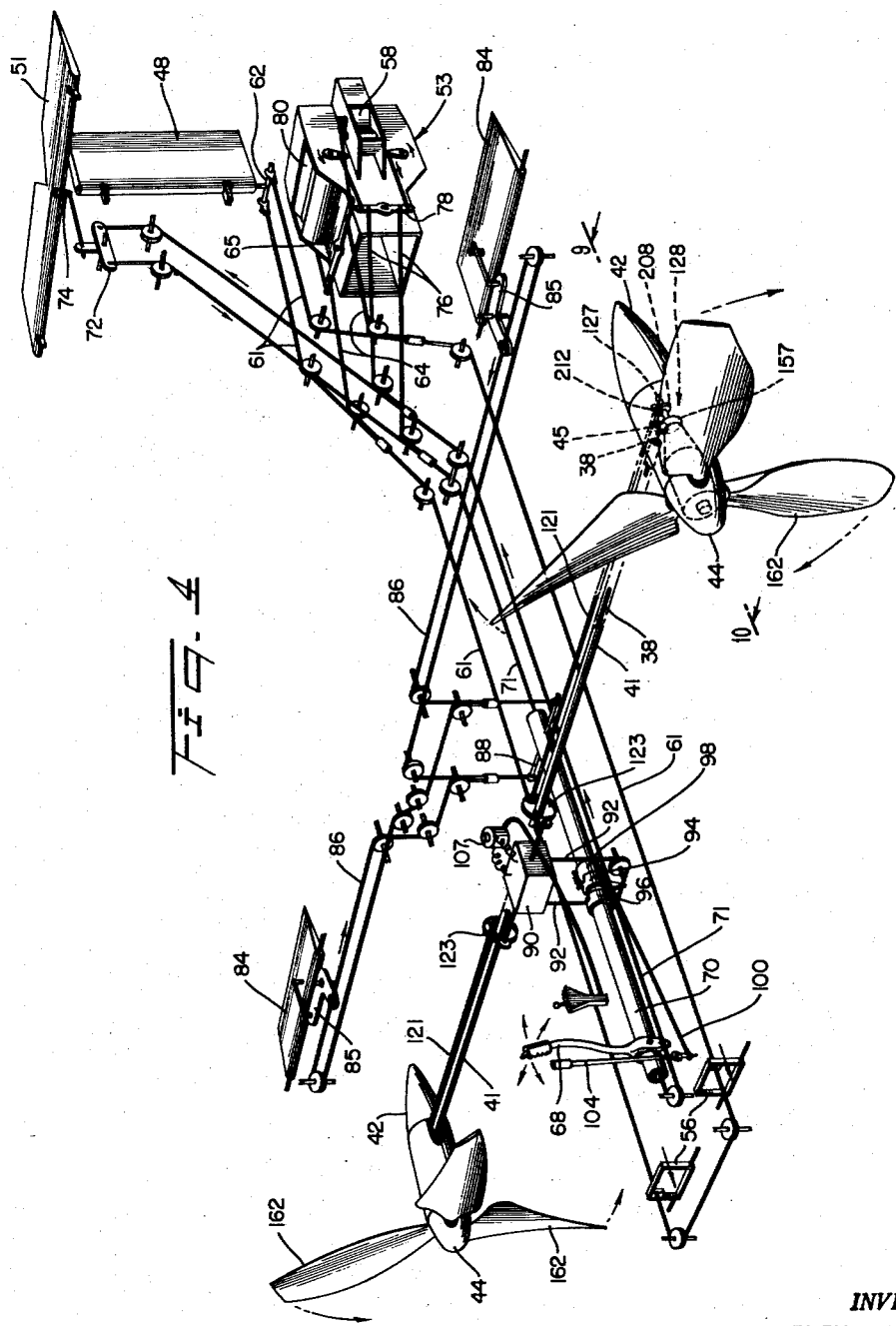
FIG. 4 is a diagram showing appropriate air controls for an aircraft embodying the invention.

FIGS. 14, 15 and 16 are sections, respectively, on the lines 14—14, 15—15 and 16—16 of FIG. 13;

FIG. 17 is a diagram showing an end view of one of the propeller blades when the aircraft is in horizontal forward flight, the full lines showing the blade in one position and the dotted lines showing it 180° later;

FIG. 18 is a simplified diagram providing for visualization of "radial lift force" generation by a propeller during horizontal flight;

FIGS. 19 and 20 are velocity vector diagrams of propeller blade sections when the propeller axis is titled at a positive angle A to the relative wind;

FIGS. 21 and 22 are force vector diagrams of propeller blade sections wherein the propeller axis is positively tilted to the relative wind, and showing "radial lift force" components;

FIG. 23 is a rear elevation of a novel jet nozzle assembly for aircraft yaw and pitch control at low airspeed, and is a view on the line 23—23 of FIG. 24;

FIG. 24 is a section on the line 24—24 of FIG. 23;

FIG. 25 is a section on the line 25—25 of FIG. 24;

FIG. 26 is a diagram showing some alternative flight paths for an aircraft according to the invention;

FIG. 27 is a graph showing stall and take-off speeds of aircraft wings with respect to wing loading; and, FIG. 28 is a chart showing the relationship of different types of aircraft in respect to their speed ranges and modes of lift.

Referring first to FIGS. 1-3, there is shown a typical novel aircraft configuration according to the principles of the invention. In the interest of simplicity, this is shown as a pilot-carrying craft without provision for passengers. However, since the principles of the invention may be applied to both small and large aircraft, up to sixty thousand pounds gross weight or more, the cargo and passenger arrangements, as well as the disposition of powerplants, fuel and other equipment, become to a large extent matters of design choice to be established according to well known aircraft design practices. A typical aircraft embodying the invention is shown in the drawings as comprising a streamlined fuselage 30 with a pilot's accommodation 31, a suitable landing gear 34 and an empennage 35 at the rear of the aircraft to afford pitching and directional stability and control.

The power means for imparting lift and forward motion to the aircraft comprises a novel combination of engines and propellers, including novel mounting and power transmitting means, the construction being such as to permit novel and efficient use of turbine engine exhaust for control purposes and to permit tilting or gimbaling of the propeller shafts through a quadrant without appreciably affecting the transmission of power thereto or the control of the blade pitch thereof by means to be later herein described. In the embodiment illustrated there is centrally mounted within the aircraft fuselage a powerplant 36 (FIG. 7) comprising preferably one or more light weight gas engines or turbines, which engines drive laterally extending hollow shafts 38 in unison through a gear box 40 (FIG. 8). The shafts 38 are surrounded and partially supported by laterally extending hollow booms 41 mounted for limited angular movement in a manner to be hereinafter described. Nacelles 42 are secured by a series of bolts 43 to the outer ends of booms 41 for angular movement therewith (FIG. 12). Multiblade (preferably more than two blades) oppositely rotating controllable pitch propellers 44 are rotationally driven from the shafts in the nacelles 42. Suitable actuating means, to be described, are provided to rotate booms 41 and thus tilt the nacelles 42 and hence the propellers, between the positions shown in FIGS. 2 and 3.

In order to minimize the drag or resistance of the booms 41 while the aircraft is airborne, said booms may be surrounded by small suitably shaped airfoils which are preferably fixed in relation to the fuselage. As shown, the airfoils 32 are shaped like miniature wings and at the higher forward speeds, the same will not only reduce drag but will also contribute an advantageous lifting force to supplement the major lifting force, that is, the radial force of the propellers. During vertical flight at relatively low speed the drag or resistance of the small airfoils is not of real consequence, but if desired, provision could be made to rotate the same with or independently of the booms 41.

In FIGS. 2 and 3 the generalized location of the center of gravity is shown with respect to the lifting forces available to the aircraft. With the propeller axes vertical for take-off and vertical lift the transverse plane which includes the lines of propeller upward thrust T may pass vertically substantially through the center of gravity 33 as shown in FIG. 2. In the substantially horizontal flight attitude, as shown in FIG. 3, propeller radial force $L_p$ as a lifting medium also acts reasonably close to the center of gravity, as does the airfoil lifting force $L_a$ when it becomes effective with substantial forward speed. Any moments resulting from these forces are of an order of magnitude that may be readily compensated by empennage control. As illustrated, the location of the center of gravity is exemplary only. This point may be even more favorably located in some designs. It should be noted that with the small airfoil 32 and short nacelles, the propeller hub or disk center swings through a relatively small arc, so that the propeller disk center never moves far from the vertical transverse plane through the center of gravity.

The two propellers 44, as stated, rotate oppositely in directions such that upsweeping blades pass across the leading edges of the airfoils 32. The airfoils do not extend outwardly beyond the nacelles into the wake of the downsweeping blades. If the airfoils are made movable to vary the angle of incidence thereof relative to the fuselage, it could be desirable to cause the downsweeping blades to pass across the same.

The empennage 35 comprises a vertical fin 47 carrying a rudder 48 and a horizontal stabilizer 50 carrying controllable elevator 51. These elements 47–51 are used and managed in the usual fashion of an airplane when the horizontal flight speed is sufficient to render these air control surfaces effective to produce directional and pitching moments upon the aircraft. For the situation where the aircraft is operating at low forward air speed, as in vertical flight or hovering and in transitional flight, novel means are provided by the invention for producing the required directional and pitching control moments. In the illustrated embodiment these moments are produced by jets under the control of valves of a novelly constructed nozzle box assembly 53 (FIGS. 23–25), to be later described in detail, which may be furnished with exhaust gas under suitable pressure from the engine 36 through a tail pipe 54. Alternatively, the nozzle box 53 may be furnished with fluid under pressure from other sources to produce jet reaction, or the jet exhaust from the engine may be supplemented by other means should that be necessary or desirable.

To provide the pilot with yaw or directional control of the aircraft, the latter is provided with rudder pedals 56 connected to simultaneously operate the rudder 48 and directional control jet nozzle valves 58 and 60 in opposite sides of nozzle box 53 (FIG. 4). While cable connections are shown for the operation of the air controls, other known sorts of connections may, of course, be used. Rudder cable 61 from the pedals 56 runs over appropriate pulleys and connects with a T-bar or horn 62 of the rudder 48. Cable 61 is joined with branch cables 64 connected to a double-ended, pivoted lever or horn 65 swingable to operate the directional control jet valves 58 and 60 for yaw or directional control during vertical movement and at low or no air speed, in a forward direction.

The usual control stick or wheel for pitch and roll control of the aircraft is shown at 68, pivotally mounted on a torque tube 70 which is in turn mounted for limited angular movement by lateral tliting of the stick. For pitch control, the lower end of stick 68 is connected to a cable 71 which extends over pulleys to a triple arm pivoted lever 72 mechanically connected to an elevator operating horn 74. Elevator 51 may thus be actuated by fore and aft tilting of the stick 68. The cable 71 is spliced into branch cables 76 connected to opposite ends of pivoted lever 78 which is connected to operate the pitch control nozzle valves 80 and 82. The latter serve, in a manner to be more specifically hereinafter described, to direct jet streams upwardly or downwardly coincidentally with upward or downward movement, respectively, of the elevator 51 for pitch control.

Novel means are provided for controlling the roll of an aircraft contemplated by this invention. During takeoff and vertical flight at zero or low forward speed, roll control is obtained by differentially varying the blade pitch of the two propellers 44, whereas during forward flight at a sufficiently high speed, such control may be obtained through ailerons or the equivalent which may be supported by booms 41 and, if desired, form movable parts of the airfoils 32. Novel means are also provided for rendering the differential blade pitch control means selectively operable. In the illustrated construction, roll control of the aircraft may be afforded during horizontal cruising and high speed flight by ailerons 84, each of which is connected at all times by a motion transfer linkage mechanism 85 to a cable 86, the ends of which are coupled to arms 88 extending laterally from the torque tube 70 which is rocked about its axis by the stick 68.

Under conditions of low air speed when the ailerons are not sufficiently effective and when the propellers 44 are substantially in or near the axis vertical position, lateral or roll control of the aircraft is afforded by differential pitch control of the propeller blades. During high speed flight, the ailerons are effective and the differential propeller blade pitch control may be locked out. The arrangement for this is broadly shown in FIG. 4 and is shown in detail in FIGS. 5 and 6. A housing 90 contains mechanism connected by cables 92 to a depending strut 93 on a collar 94 slidably embracing the tube 70. The collar 94 may be selectively moved along the shaft to drivingly engage a collar 96 secured to the tube 70, the collar 94 having a dog 95 engageable in a notch 97 in the collar 96. Collar 94 may be moved rearwardly to disengage notch 97 and operatively engage a fixed collar 98 to thus immobilize the cables 92, the collar 94 having a notch like notch 97 engageable by a dog 99 on collar 98. Shifting of the collar 94 along tube 70 is effected by a rod 100 connected to a lever 104 operable by the pilot. When in the forward position, the collar 94 is rocked with tube 70 by lateral tilting of the stick 68 and actuates the differential blade pitch control mechanism in the housing 90. When in the rearward position, the collar 94 is locked against rotation, thereby rendering the differential pitch control of the propeller blades inoperative so that the two propellers then operate pitchwise in unison or collectively, as hereinafter described.

Figure 5:
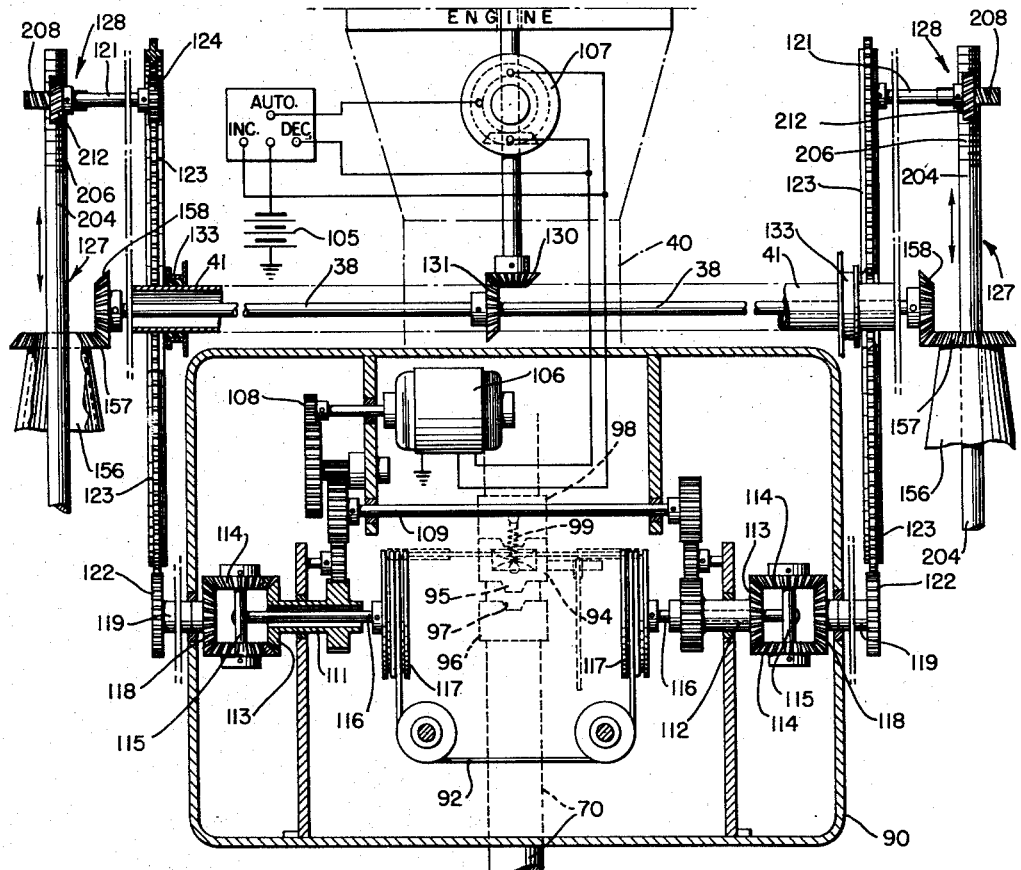
FIG. 5 is a top view, partly in section and partly diagrammatic, illustrating novel mechanism suitable for collective and differential pitch control of the propeller blades.
Figure 6:
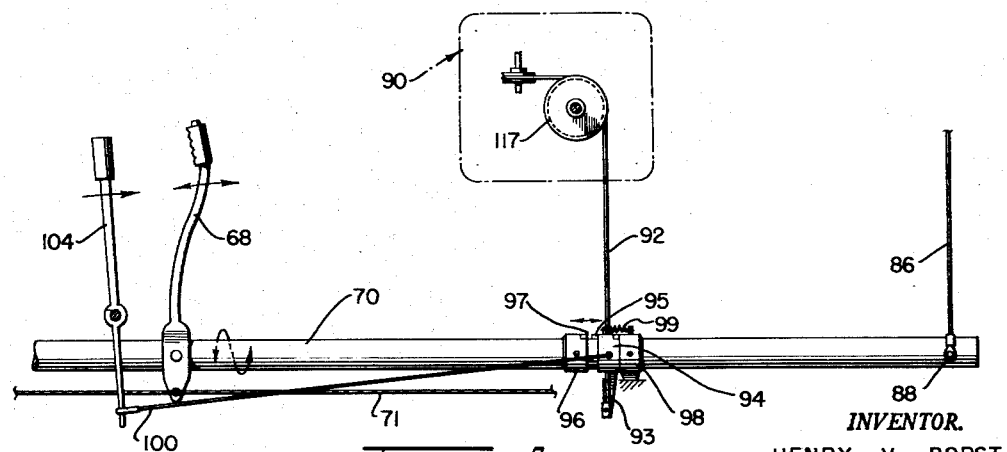
FIG. 6 is a side elevation of part of the mechanism of FIG. 5, along with means for selectively activating the propeller differential pitch control means.

Except for roll control when the aircraft is in vertical or low speed forward flight, it is desirable to change the blade pitch of the propellers in unison or collectively to thereby control engine and propeller speed. This invention contemplates novel mechanism for effecting collective blade pitch control. FIG. 5 thus further shows an electric servo motor 106 within the housing 90, which motor drives mechanism for effecting collective changes of pitch of the blades of both propellers. In the illustrated embodiment, the collective blade pitch control mechanism is shown as being responsive to a governor 107 which senses engine shaft speed. Collective propeller blade pitch may be thus controlled in some installations to hold propeller speed and engine speed constant at a selected value in the same fashion as constant speed propellers are controlled according to the prior art. That is, as engine and propeller speed tend to increase, propeller blade pitch is automatically increased to provide greater engine load, whereas if propeller and engine speed tend to decrease, propeller blade pitch is decreased to reduce engine load and enable restoration of the desired engine speed.

It may be desirable in other installations to make collective blade pitch changes responsive to other factors. For example, it may be desirable in some cases to make the blade pitch control mechanism responsive to angular or gimbaling movement of the nacelles 42.

Referring to FIGS. 5 and 8 for further detail, the governor 107, which may be of any suitable known construction, senses engine underspeed or overspeed and operates a switch that serves to energize the servo motor 106 from a battery 105 for rotation in one direction or the other to turn an output gear 108 accordingly. Through suitable reduction gearing, the gear 108 drives a shaft 109, which drives a starboard shaft 111 and a port shaft 112, said shafts 111 and 112 being driven in unison through suitable gearing. These shafts drive input gears 113 of identical oppositely disposed differentials. Each differential comprises a collective pitch input gear 113 driven by shaft 111 or 112 and meshed with two planet gears 114 mounted on a spider 115 driven by shaft 116. For effecting differential blade pitch changes, the two shafts 116 and spiders 115 are driven oppositely by rotation of the sleeve 94 which is transmitted through cables 92 and pulleys 117. The sets of planet pinions 114 mesh with an output gear 118. When the motor 106 rotates in either direction, the differential input gears 113 are rotated correspondingly in unison. If the collar 94 and hence, spiders 115, are stationary, the motion of input gears 113 is transmitted to the output gears 118 to operate them in unison to effect collective blade pitch changes. The gears 118 drive shafts 119, thence shafts 121 through transfer gearing including outside pinions 122, meshed with external teeth on gears 123 piloted on booms 41, and inside pinions 124 on the inner ends of shafts 121 which mesh with internal teeth on gears 123. Shafts 121 pass outwardly along the booms 41 to the propeller nacelles. The blade pitch of respective propellers is regulated by operating elements 127 coupled to the shafts 121 through gear and screw connections 128 to be more fully described hereinafter.

If the stick 68 is tilted laterally and if the collar 94 is in its forward position to move with tube 70, the spiders 115 will be rotated in opposite directions by the cable connections 92, and the starboard and port output gears 118 will be rotated in opposite directions. Such opposite rotation, through the connections to the propellers already described, adjusts the blade angle of the propellers differentially, this differential pitch adjustment being superimposed upon the collective pitch angle dictated by engine speed and hence by the position of the differential input gears 113. Thus, collective blade pitch can at all times be adjusted through the operation of the governor controlled servo motor 106. Likewise, differential blade pitch can be called for at will by the stick 68 at any time, as during vertical or low speed flight, or the differential blade pitch control mechanism may be selectively locked out and rendered inoperative during high speed forward flight when ailerons 84 are effective.

From the structure thus far described it will be appreciated that the aircraft of the invention has a complete set of conventional controls in the form of ailerons, rudder and elevator which are available at all times but which are effective only when the horizontal air speed of the aircraft is significant. At low speed of the aircraft and during vertical motion, directional and pitch control are afforded by the jet reactor or nozzle box assembly 53, while roll control is afforded by differential pitch control of the propeller blades.

Further novel features of the invention are embodied in the simple, yet rugged and novelly combined mechanisms for transmitting power to the propellers to drive the same and for simultaneously transmitting power from a suitable source to tilt or gimbal the nacelles between axis vertical and axis horizontal positions. These mechanisms are generally illustrated in FIGS. 7 and 8. In the illustrated embodiment, a gear box 40 encloses a right angle gear drive comprising a bevel pinion 130 driven by the engine 36 through a suitable clutch connection 132. Pinion 130 drives a bevel gear 131 of larger diameter so that the gear rotates at less than engine speed. The hollow shaft 126 of this gear is supported at its ends by bearings 129 in housing 40, and is spline-coupled at its ends to the lateral driving shafts 38.

The booms 41 embrace shafts 38, and have the inner ends coupled together rigidly and securely by a yoke 134 which partly surrounds the gear housing 40. The booms are journalled in yieldable bearings 133 secured to the aircraft frame structure, to enable angular adjustment of the booms and yoke assembly. Further, the housing 40 is journalled relative to the yoke 134 in yieldable bearings 135. The forward end of the casing of engine 36 is secured to or integral with the housing 40, the latter is piloted in the yoke 134, and the yoke and booms 41 are piloted in the aircraft structure at 133. Thus, the forward end of the engine-gear box unit is mounted on and retained in proper alignment with booms 41. The booms 41 may be rotated or oscillated in bearings 133 by one or more actuators 136 (FIG. 7) which may be axially expanded and contracted between the frame of the aircraft fuselage, a portion of which is shown at 138, and a lever 140 secured to one or each of booms 41. The operation of the actuators 136 is controlled by an appropriate control device 142 energized by an electrical or other suitable power source 144, the control device being responsive to a manual control 146 which preferably takes the form of an electrical switch mounted on top of the control stick 68. The actuators, control device and power source therefor may be of any appropriate known form—hydraulic, electrical or mechanical.

The boom oscillating mechanism is preferably constructed to provide a predetermined maximum gimbaling rate which may be of the order of a few degrees per second. When transition is desired from vertical to horizontal flight, the pilot may actuate the controls to effect gimbaling of the nacelles 42 and hence, the propeller shafts from the vertical to a desired small angle A, such as about five degrees, above the horizontal or relative wind direction. This will initiate operation of the actuator 136 to swing the nacelle at a pre-established rate to the desired gimbal angle A. However, if the pilot should wish to stop, slow down or reverse gimbaling movement of the nacelles at any time, he may do so by appropriate actuation of the control 146. Gimbaling in the reverse direction is accomplished in like manner for transition from forward to vertical flight.

FIG. 7 also shows in greater detail the means by which propeller differential blade pitch control is transmitted from the control housing 90 (FIGS. 5 and 6) to the shafts 121 and thence to the propeller blades, regardless of the gimbal angle position or gimbaling motion of the nacelles. Each shaft 119 is provided with an outboard pinion 122 meshing with the outside of an internal-external gear 123 journalled on a boom 41. Outboard pitch control shafts 121 are carried in bearings 148 on booms 41, these shafts each having an inboard pinion 124 meshing with the inside of each gear 123. Thus, regardless of gimbal angle, i.e., the angular position of booms 41 and nacelles 22, propeller blade pitch change may be readily accomplished throuh the gear trains 122, 123 and 124. The speeds and ratios of the pitch changing transmission train are so arranged that a considerable number of revolutions of shafts 119 are necessary to accomplish a moderate blade pitch angle change. Thus, the small amount of relative rotation of shafts 119 and 121 caused by the gimbaling of the booms will cause a negligible amount of blade pitch change, which change may be immediately compensated by action of the governor 107 and servo motor 106.

Figure 11:
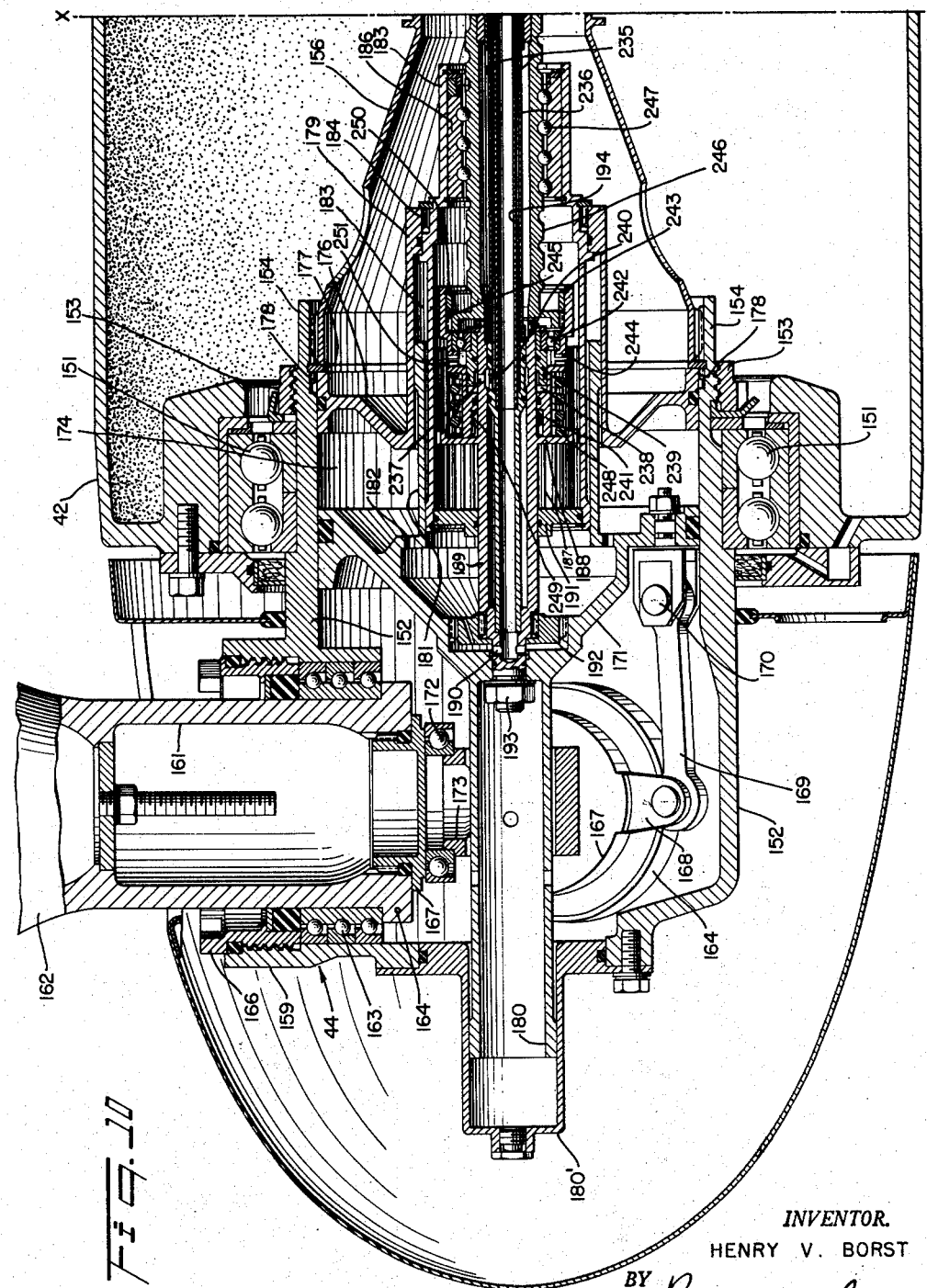
FIG. 11 is a schematic diagram of part of the propeller hydraulic system.

Reference will now be had to FIGS. 9, 10 and 11 in which the nacelles 42 and propeller 44 are shown in detail. Although other types of controllable pitch propellers are usable with the aircraft of this invention, the one here shown provides required function, and is light in weight and dependable. A particular feature of the illustrated propeller is that it should preferably have a pitch lock which will prevent decrease in propeller blade pitch due to centrifugal twisting moments should there be a failure of the control or power means by which blade pitch changes are demanded and effected.

The propeller blade pitch changing mechanism as shown in FIGS. 9–12 is hydraulically actuated. The hydraulic system for each propeller is wholly contained within the nacelle 42 which carries the propeller and derives its power from engine 36. The nacelle 42 is a generally cylindrical body, the forward end of the nacelle embracing combination thrust and radial bearings 151 of relatively large diameter. The propeller 44 comprises a rearwardly extending cylindrical hub portion 152 which is journalled in bearings 151 and is secured in fixed relation to the inner races of the bearings by a locked nut 153. Rearward of the nut 153 is an internally splined portion 154 which is drivably engaged by a coaxial flared portion of a hollow shaft 156 (FIG. 10). The cylindrical rear end portion of said shaft, journalled in bearings 147, is splined to said flared portion at 149 and is integral with a bevel gear 157 forming part of the bevel gearing 45 (FIG. 7) driven by the laterally extending power shaft 38. The latter has a splined driving connection 155 with the hub of a bevel pinion 158 journalled in the nacelle on bearings 160 (FIG. 12) and meshing with bevel gear 157. The forward end of the cylindrical hub portion 152 carries three equally spaced blade sockets 159 in which the shanks 161 of propeller blades 162 are journalled by stacked anti-friciton bearings 163 extending from a blade shank flange 164 to a locked blade retaining nut 166 by which the blades are held in position. At the innermost end of each blade a lever element 167 is splined, this element having a lever 168 to which is pivoted a connecting rod 169. The latter is pivotally connected at its rearward end at 170 to an axially movable piston 171. The periphery of the piston is slidable along the inner cylindrical surface of the hub extension 152 and has a forward projection 180 slidable in a receptacle 180′, integral with the front cover on hub 152, to pilot the piston and prevent its tipping. At the innermost end of each lever element 167 are accommodations for a preload thrust bearing 172 which is supported in a known manner by a floating polygonal center member 173 surrounding the forward extension 180 on piston 171. Since there are ordinarily three or more blades 162 in the propeller, the inner ends of the blade shanks 161 all react upon the member 173 and thus the preload reactions of all blades are balanced against each other. The floating member 173 avoids the requirement for a fixed preload abutment within the propeller hub and thereby simplifies the construction of the propeller.

The desired changing of the pitch of blades 162 by angular adjustment thereof about the radial or longitudinal axes of the blades is effected by axial movement of piston 171 in cylinder 152. As the piston 171 moves axially, all blades of the propeller, through the connecting rods 169 and lever element 167, will be changed in pitch in unison. The blades of the propeller preferably are not counterbalanced and during rotation will tend to move to the flat pitch position due to a natural centrifugal twisting moment on the blades. Centrifugal twisting moment force is thus utilized for decreasing propeller blade pitch. Adequate force must be provided for increasing pitch which will overcome friction in the system and the centrifugal twisting moments.

In the illustrated embodiment, the required pitch increasing force is supplied by a hydraulic system including piston 171. The piston defines the left hand or forward end as shown of a hydraulic cavity or chamber 174, the right hand or rear end of which is, in part, defined by an annular closure member or bulkhead 176 sealed within the cylinder 152 and locked against axial movement therein by a snap ring 177 and splines which engage a shoulder in the cylinder. The cooperating splines on member 176 and in the cylinder 152 at 178 hold the same against relative rotation.

Bulkhead 176 carries a rearward cylindrical extension 179 which embraces a sleeve 181 connected to the piston 171 by a perforated flange 182. The exterior of sleeve 181 has a sliding fit within the extension 179 so that piston 171 is further stabilized against tilting as it slides in cylinder 152.

The invention contemplates valve means novelly combined with the above described construction and valve operating means for controlling the flow of hydraulic fluid to and from chamber 174 to thereby effect or permit reciprocating movement of piston 171 and hence variations in the pitch of the propeller blades. In the form illustrated, a fixed sleeve 183 partially within sleeve 181 is secured to extension 179 against axial and rotational movement relative thereto by abutting shoulders, splines at 184 and a snap ring. Sleeve 183 is thus fixed with member 176, 179 against movement relative to the propeller hub 152. The rear end of fixed sleeve 183 carries a ball nut 186 fixed in any suitable manner against movement therein and the forward end of said sleeve is internally splined at 187. Slidingly engaging splines 187 is a splined flange 188 integral with the central portion of a tube 189 which serves as a central support for parts of a novel pitch change lockout mechanism to be later described. The sleeve 183 is closed at its forward end by a sealing cover 191 through which the tube 189 has a sliding fit. An annular chamber is thus formed in cylinder 183 around the tube 189 between cover 191 and flange 188 to allow for relative axial movement of the parts. Cover 191 also forms a part of the rear wall of fluid pressure chamber 174. Tube 189 is fixedly secured to piston 171 at its forward end through a non-rotating connection 192 and a nut 193 and contains a fabricated conduit 194 communicating with the cavity 174 through radial ports 190. Conduit 194 terminates at its rearward end in a valve element 196 (left end of FIG. 9). This valve element has a radial port 197 and is embraced by a valve sleeve 198 containing a land 199 adapted to close port 197, a relief port 201 and a pressure port 202. Valve sleeve 198 is housed in and secured to a cylinder 203 secured to the left end of a fabricated pressure fluid supply tube 127, 204 extending rearwardly through shaft 156.

In a manner to appear hereinafter, tube 204 is supplied with pressurized fluid and is movable a limited amount to the right and left relative to tube 194. Thus, the tube 203, 204 may be moved so that the land 199 covers port 197, whereby the adjacent ends of both conduits 204 and 194 are closed. Alternatively, said tube 204 may be moved to the right so that conduit 194 is opened to port 201 to relieve pressure in the conduit 194 and chamber 174, or it may be moved to the left so that the port 202 communicates with the port 197 whereby pressure fluid from tube 204 may flow to conduit 194. When port 197 is closed, fluid in the propeller chamber 174 is trapped, the piston is held against rearward movement and the blades of the propeller are held at the adjusted pitch determined by the position of piston 171 and hence tube 194, 196. When port 197 is opened to port 201 fluid drains from the chamber 174 whereupon piston 171 moves to the right or rear under the influence of centrifugal twisting moments on the propeller blades and the blade pitch is reduced until port 197 is again closed by land 199 in response to movement of tube 194. When port 197 is opened to pressure supply tube 204 through the port 202, pressure fluid enters the chamber 174 driving piston 171 forward or to the left and increases the pitch of the propeller blades until port 197 is again closed by relative movement of parts 194 and 198.

The fore and aft movements of pressure tube 204 and hence of sleeve 198 of the follow up valve mechanism are effected by the above described manual and governor actuated means for controlling differential and collective blade pitch adjustments. Said means function through gear and screw connections 128 (FIGS. 5 and 9) to shift tube 204 which forms part of the pitch changing element 127 diagrammatically shown in FIG. 5. The element 127 includes an externally threaded sleeve 206 secured to the tube 204 and embraced by a rotatable nut 207 on the exterior of which a worm wheel 208 is formed. The nut 207 is journalled in a casing 209 secured to the rear cover plate 211 of the nacelle 42. Meshed with the worm gear 208 is a worm gear 212 in right angle relation, the latter being mounted on the end of shaft 121 leading along the boom 41 from the propeller blade pitch coordinating and control mechanism previously described in connection with FIG. 5.

Tube 204 is continuously supplied with fluid under pressure by a pump through a fluid transfer assembly 214 secured in the housing 209 in concentric relation with said tube. As shown, said assembly comprises an outer tube 210 and an inner tube 213, the latter extending forwardly into sleeve 206 for splined engagement therewith to hold said sleeve against rotation. The outer tube 210 is secured to casing 209 and secured to tube 213 by any suitable means such as a pin 205. Tubes 210 and 213 are interiorly and exteriorly grooved to form a forward annular chamber 216 to receive pressurized fluid from the outlet 222 of a fluid pump contained within a pump housing 217. Fluid transfer from chamber 216 to the interior of tube 204 is afforded through a port 218 and tube 210 in all positions of axial adjustment of tube 234 relative to assembly 214.

FIG. 11 shows schematically the hydraulic circuit wherein 219 is the fluid pressure pump just referred to. The pump receives fluid from a sump 221 which may be the interior of the nacelle 42 and delivers fluid through conduits 222 to the chamber 216. The rotary pump is driven by a gear 223 meshed with the gear 224 formed on the rear of the propeller driving sleeve 156. The hydraulic system is preferably protected against excessive pressure by a pressure relief valve 226 connected to the pump outlet.

In the normal operation of the propeller pitch changing system the threaded sleeve 206 travels longitudinally back and forth in response to rotation of worm gear 208 and has a specific position for each specific propeller blade angle setting. The follow up valve at the left end of FIG. 9 including the elements 196—203 moves to the right and to the left as blade pitch change is called for and effected. The forward end or inner portion 196 of this valve moves with the propeller piston 171 and slightly relative to the rearward outer portion 198 to connect port 197 with either port 201 or 202.

In combination with the novel pitch changing mechanism above described, the invention provides a blade pitch locking system whereby, should there be a fluid pressure supply failure, the piston 171 will be automatically locked against rearward or pitch decreasing movement, preventing propeller blade pitch change in the pitch decreasing direction with the consequent possibility and danger of overspeeding and losing thrust effectiveness. In the form shown, this novel blade pitch locking system is connected to the fluid pressure system described above through a low pressure detection valve mechanism 227 connected to the pump output line 222. Valve 227 contains a spring pressed plunger 228 movable into a reduced bore 229 to cut off communication between pressure line 222 and valve outlet 231. If pump pressure is sufficient, the plunger 228 is pressed downwardly against spring pressure as shown and allows the fluid to pass to passage 231. This passage communicates with a rear chamber 232 in the sub-assembly 214, and thence through holes 233, with the interior of tube 213 and a tube 234 extending forwardly and coaxially within the tube 204. The rear end of tube 234 is slidably supported in tube 213 and the forward end thereof is secured to and opens into the valve sleeve 198 which is furnished with a fluid transfer connection whereby fluid within tube 234 passes to a tube 236 embracing the conduit 194 (FIG. 10). Thus, an annular fluid channel 235 is formed between the tubes 194 and 236 which receives fluid under pressure from the chamber 232 through tube 234. This channel extends to a point within tube 189 and communicates through radial ports 237 and 240 with an expansible annular chamber 238. The latter is formed between two telescoping piston and cylinder members 239 and 241 surrounding tube 189. A dog clutch member 243 having radial teeth 244 is mounted by means of a roller bearing 242 on piston member 239 and is secured at its right end to a ball screw shaft 246 by splines 245 and a split ring 250. Shaft 246 passes through nut 186 and is coupled to said nut for relative rotational and axial movement by balls 247 which engage the spiral groove on the shaft. The ball screw and nut arrangement per se is a known mechanism and should require no further description except to say that there is provision, not shown, for recirculating balls 247 as the nut and screw translate and rotate relatively. This type of ball screw is a low friction reversible device.

The cylinder 241 is urged in a rightward direction by a stiff spring 248 which bears at its leftward end against the flange 188. Further, the cylinder has a sliding spline connection 249 with the tube 189 so that it has no rotation relative to the propeller. The rightward outer end of the cylinder 241 is provided with face dog clutch teeth 251 movable by spring 248 into engagement with the teeth 244 on piston 239 when there is a failure of fluid pressure in chamber 238.

As long as fluid at sufficient pressure is present in the cavity 238, the spring 248 will be compressed thereby and the dog clutch teeth 244 and 251 will be separated from one another. As the piston 171 travels rightwardly and leftwardly for effecting propeller blade pitch changes, the ball screw shaft 246 moves axially with it, but is free to rotate in the nut 186 during such axial translation, under no load. However, if fluid pressure should fail in the supply line for chamber 174 and hence in the chamber 238, the spring 248 will press the clutch teeth 251 into engagement with teeth 244 to prevent rotation of ball screw shaft 246 relative to the propeller. Thus, as the propeller blades are urged to decrease in pitch by centrifugal twisting moments, the piston assembly 171 is prevented from rearward motion by the ball screw and nut assembly since the screw shaft 246 is clutched against rotation relative to nut 186 and hence cannot move axially relative to the axially fixed components of the propeller assembly. The propeller blades are thus locked against pitch change in either direction whenever the hydraulic pressure becomes insufficient to effect an increase in pitch angle or drops below a predetermined value.

In the aircraft controls as shown in FIG. 4, the two control rods 121 for actuating the blade pitch changing mechanisms of the two propellers are operated both collectively (in unison) and differentially, as described above. If the pitch change mechanism of one propeller should fail and become pitch-locked, the blade pitch of the other propeller can still be varied as required for aircraft roll control in vertical or hovering flight. Pitch control of the properly functioning propeller is desirable also in the emergency condition of an uncontrollable propeller to enable the pilot to trim the still controllable propeller to yield the same thrust as the uncontrollable one.

The propeller, as shown in FIG. 10, is of a type adapted to be driven through bevel gears 157 from drive shafting 38 which is offset from the propeller shaft. The propeller shaft comprises the cylindrical hub or extension 152 which is of relatively large diameter and contains the pitch changing mechanism which is concentric with the propeller axis. With this large hub diameter, bearings 151 are the only bearings needed to support the propellers against bending stresses as well as against axial thrust. This provides a light weight and efficient propeller mounting which cannot readily be attained with the more conventional propellers of the prior art.

In carrying out the present invention it is important that the propeller be suitably designed to generate a substantial radial force which will sustain the aircraft in horizontal flight while at the same time generating axial thrust to propel the aircraft forward. This necessitates a novel concept and wide departure from conventional propeller design since the radial lift force generated is relatively independent of rotational speed and the propulsion thrust for which conventional propellers are designed and is principally dependent upon the chord of the blade and the angle of advance. The desired novel result is attained by novelly constructing propeller blades 162 with chords that are very wide in the innermost or shank portion and diminish at the tip as illustrated in FIGS. 13 to 16. The pitch distribution of the blade preferably varies from a relatively small angle B′ in relation to the plane of rotation at the tip (FIG. 16) to a relatively large angle at the shank (FIG. 14). Preferably, the blade 162 has an overall activity factor of well over 160, this activity factor representing a nondimension function of propeller planform designed to express, in a related way, the integrated capacity of a respective blade planform for absorbing horsepower. Mathematically, activity factor is defined as follows:

$$AF = \frac{100,000}{16} \int_{r=0.2R}^{r=R} \frac{b}{D} \frac{r^3}{R^3} d\left(\frac{r}{R}\right)$$

where:
$D$ = propeller diameter
$R$ = propeller tip radius i.e.

$$\frac{D}{2}$$

$r$ = radius of any blade element
$b$ = blade width at radius $r$ while the activity factor of each of the blades 162 of the three-bladed propellers 44 should be at least 160, as indicated, to thereby provide a total activity factor of at least 480 per propeller, the activity factor of each blade may be less than 160 in the case of a propeller having more than three blades provided however that the activity factor for the propeller totals at least 480. This high activity factor is secured principally by a chord distribution along the blade which differs markedly from conventional practice. This novel propeller configuration enables the development of static and cruise thrust at high efficiency, along with the added unconventional development of maximum radial force which is novelly utilized to lift or sustain the aircraft in space during forward flight.

In the novel aircraft herein disclosed, high propeller efficiency for vertical thrust at take-off, and for vertical lift force and propulsive thrust in transition and cruise are obtained with this novelly constructed propeller which is based upon proper selection of propeller diameter, rotational speed, blade projected area, blade area distribution, blade camber and its distribution, and blade angle pitch twist distribution. Propeller diameter and rotational speed are determined by the thrust requirements at the hover and cruise conditions by conventional or classical propeller design procedures. For propeller diameter established on cruise thrust performance and hover thrust efficiency, a maximum blade projected area is determined for maximizing radial lifting force, as limited by overall propeller weight and structural considerations. At both the static or hover and cruise thrust conditions, it is desirable to place as much projected area as possible at the inner parts of the blade, closer to the hub than to the tip. This makes it possible for all blade sections to operate at angles of attack below the stall at the static or hover condition, thus obtaining nearly optimum efficiency thereat.

In the cruise thrust condition, the wide inboard blade sections do not absorb as much power as the blade portions located near the blade tips. Therefore, the blade angle twist and design lift coefficient can be distributed along the blade span in a manner so that all blade sections operate at lift coefficients to yield maximum lift/drag ratio or maximum thrust efficiency. This distribution is also determined on the basis of minimizing induced drag losses, to have the propeller operating near optimum efficiency in the cruise thrust condition.

The radial lifting force produced by a propeller for vertical lift in the novel manner herein described is a direct function of total blade area and is substantially independent of area or chord distribution from root to tip of the blade. To obtain the maximum radial lifting force from a propeller of given diameter, which is otherwise designed to have optimized performance in hover and cruise flight, the preponderance of blade area may be concentrated toward the blade roots, rather than toward the blade tips.

It may be pointed out that, it is possible to obtain good performance in the novel aircraft of the invention either at cruise, or hover, or transition flight without propeller optimization. However, for maximum advantage it is desirable to design propellers for this aircraft which have excellent and compatible qualities for excellent radial lift force, cruise propulsion, and take-off or hover thrust.

By recognizing and considering radial lifting force as an acceptable and desirable adjunct in the propellers for this novel aircraft, the propellers herein discussed can be optimized. This is untrue of all other proposed VTOL aircraft in which any radial lifting force is a curse rather than a boon. As a result, propellers for other known types of VTOL aircraft can only be designed for optimum efficiency at take-off and cruise conditions with minimized radial lift force effect.

As has been stated, the propellers 44 as shown are arranged for opposite rotation, both in directions so that upswinging propeller blades pass across and ahead of the leading edges of the airfoils 32 when the propellers are positioned for horizontal flight (FIG. 3). Thus, the airfoils are subject only to the upwashing wake from the propellers but not to any downwash. The other sense of rotation is feasible at times, according to the designer's choice. When developing radial lifting force, the upswinging blades are operating at low effective angles of attack and create a minimum disturbance of the slipstream. Consequently, this disturbance of the slipstream which flows over the airfoils will have relatively little adverse effect.

At high gimbal angles of the propellers (FIG. 1), the downwash from the propellers on the upper surface of the airfoils 32 is small in respect to the lifting thrust of the propellers. There is, of course, a "drag" created by the airfoils during vertical flight, but the small airfoils present insufficient area to the propeller downwash to reduce propeller thrust lifting effectiveness a significant amount.

In the interest of simplicity and light weight, it is preferable to fix airfoils 32, when the same are used, in relation to the fuselage and frame. It is feasible, however, to have the airfoils tiltable relative to the fuselage. Such tilting may be the same as but, preferably, is different from nacelle or propeller tilt to optimize performance. A design compromise must be reached between the simplicity of fixed airfoils and the control mechanism required therefor.

The operating requirements and a vectorial illustration of the generation of radial lift force by the propeller are diagrammatically shown in FIGS. 17 to 22. In FIG. 17 propeller 44 on the nacelle 42 is shown rotating on the axis 260, the blades 162 being horizontal and seen in end or radial view. The axis 260 is disposed at a small positive angle A to the direction of the relative wind designated by the arrow 261 or the horizontal flight path of the aircraft. This is the condition under which radial lift force is developed and novelly utilized in accordance with the present invention. In FIG. 17 the downswinging blade of the propeller is numbered 162d and the upswinging blade is 162u.

A simplified concept of radial lift force development may be obtained by referring to FIG. 18. The axis 260 of the propeller 44 is at an angle A to the direction of the relative wind 261 and hence to the horizontal flight path. The propeller operates on and accelerates the angularly incoming air and the air downstream of the propeller is diverted downwardly as shown by the arrows 262. The large mass of air thus diverted downwardly inevitably produces total reaction force represented by the vector TF in the plane of the propeller disk. This force TF resolves to a vertical component $TF_v$ which is the radial lifting force. In resolving, however, there is also a horizontal component $TF_h$ which is directed in opposition to the usual propulsion thrust furnished by the propeller.

The analysis of radial lift force may be carried out precisely by mathematical procedures. It can, however, be explained graphically or vectorially as will now be done with reference to FIGS. 19–22. FIGS. 19 and 21 represent sections of a downswinging blade 162d in the horizontal position while FIGS. 20 and 22 represent respective blade sections in relation to their angular or rotational velocity and their velocity in the direction of aircraft flight. FIGS. 21 and 22 represent the respective blade sections in connection with the force developed thereby during combined rotary and forward movement thereof.

In FIG. 19 the downsweeping blade element 162d has a vertical downward velocity component $V_r$ due to rotation, and a horizontal forward velocity $V_f$ due to forward motion of the aircraft. Combining these, the direction and velocity of the blade and conversely of the wind on the blade section, with the axis of rotation horizontal, is shown at V, this line defining the advance angle $\phi$. The blade 162d is set with respect to the line V at an appropriate angle of attack $\alpha$. However, due to the upward tilt of the propeller axis 260 through the angle A, the true forward velocity and direction of the blade in the wind is indicated by the vector $V'_f$ so that the true wind with respect to which the blade element 162d moves is on a line V'. The line V' is thus angularly displaced from the line V by an angle $\Delta\alpha$ which adds to the normal angle of attack $\alpha$ to give a greater effective angle of attack to the downsweeping blade section 162d. Also, V' is greater than V by an increment $\Delta V$, which becomes significant in magnitude at large angle A, to increase radial lift force.

Now referring to FIG. 21, the downsweeping blade section 162d is shown as operating at the effective angle of attack $\alpha + \Delta\alpha$. A normal force N is produced, resulting from operation of the blade section at the normal angle of attack $\alpha$ to which is added a force $\Delta N$ resulting from the angle of attack increment $\Delta\alpha$ and the velocity increment $\Delta V$. The forces N and $\Delta N$ resolve to horizontal and vertical components as noted. The horizontal $\Delta F_t$ and vertical $\Delta F_v$ components of $\Delta N$ add to the horizontal $F_t$ and vertical $F_v$ components of N to yield horizontal thrust force and radial lift force, respectively.

Reference may now be made to FIG. 20 which shows a section of a substantially horizontal upsweeping blade 162u having an upward velocity $V_r$ due to propeller rotation and a horizontal forward velocity of $V_f$. As in FIG. 19, the propeller axis is tilted upwardly at an angle A to the relative wind, and the actual forward velocity and direction of the blade section are shown by the vector $V_f$. Accordingly, the resultant direction and velocity of air flow with respect to the blade is shown by the vector V. The effective angle of attack of the blade now becomes $\alpha - \Delta\alpha$ representing a reduced blade angle of attack and the effective direction and velocity of the blade is V' less than V by $\Delta V$.

In FIG. 22 the blade 162u produces the normal force N but there is a decrement in radial lift force resulting from $\Delta\alpha$ and $\Delta V$, so that $\Delta N$ is subtracted from N. It will be seen that $\Delta F_t$ reduces $F_t$, in other words, the horizontal thrust of the blade is less than it is for the downsweeping blade. When blade angles of attack are on linear portions of the airfoil lift curve, the $\Delta F_t$ forces for the upsweeping and downsweeping blades cancel each other so that there is no net change in the thrust produced by the propeller resulting from its operation at the angle A to the relative wind. In the case of the vertical or radial components $F_v$ and $\Delta F_v$, the downswinging blade vector $F_v$ acts upwardly while upsweeping blade vector $F_v$ acts downwardly. Accordingly, these cancel each other producing no net lift on the propeller. However, $\Delta F_v$ for both the downsweeping and upsweeping blades act upwardly, producing a net upward lifting force of $2\Delta F_v$ on the propeller, which is the radial lifting force. This force is created at no expense of engine power or torque as can be proved mathematically.

In operation at large angle A, in the range of twenty to sixty degrees, the radial lift force increment due to $\Delta V$ becomes quite large, yielding more lift than might be expected if $\Delta V$ were not considered. At lower angle A, the $\Delta V$ increment becomes relatively smaller. The radial lift force for any unit of span of a horizontal downswinging propeller blade where the angle A is moderate may be represented by the expression $(Aq) \cdot b \cdot a \cdot \sin \phi$ wherein $Aq$ represents the dynamic pressure head times the angle A; $b$ is the chord of the blade; $a$ is a constant incorporating the lift coefficient which in effect is the slope of the lift curve; and $\sin \phi$ is the sin of the angle $\phi$ indicated in FIGS. 19 and 20 which is in effect the angle of advance of the blade section.

The lift represented by this relationship may be summed for all sections of the propeller blade. To secure the radial lift force effect for the whole propeller, this value is multiplied by $$\frac{B}{2}$$

wherein B is the number of blades in the propeller. This means that the radial lift force for a three-blade propeller is one and one-half times the lift for the downswinging horizontal blade and that the lift for a four-blade propeller is twice that of a single downswinging blade. This relationship changes according to blade number due to the differing angular relationship of the propeller blades. A propeller having three or more blades will yield essentially uniform radial lift force. While the radial lift force from each blade changes from zero at its vertical position to maximum at horizontal position to zero at its other vertical position, the summation of forces for three or more blades remains substantially constant. However, in a two-blade propeller, the radial lift force cyclically changes from zero to maximum as the propeller rotates.

The details of construction of the novel nozzle box assembly 53 by which jet reaction from the powerplant or other suitable source may be directed laterally or vertically to produce forces on the tail of the aircraft for directional or pitch control are shown in FIGS. 23–25. The pitch force producing valves 80 and 82 are best shown in the upper and lower parts of FIG. 24 and the yaw or directional force producing valves 58 and 60 are best shown at the sides of the assembly (FIG. 25). The assembly 53 comprises a duct 266 of rectangular cross section which is a continuation of the tail pipe 54 of the turbine powerplant 36. The duct 266 terminates in a closed rear end wall 267 but is formed with four openings, around its rearward end, there being an upper opening 268 to accommodate the valve 80, a lower opening 269 to accommodate the lower valve 82, a side opening 271 to accommodate the valve 60 and a side opening 272 for the valve 58. The general construction of each of valves 80, 82, 58 and 60 is similar and one will be described. Valve 80, for instance, comprises a pivot shaft 273 and a vane 274, the vane being secured between end disks 276. A valve vane 277 is also secured to the end disk 276 substantially parallel to the vane 274 and spaced therefrom. In the position of valve 80 as shown in FIG. 24, the vanes 274 and 277 define a passageway of rectangular cross section opening to the interior of the duct 266 for guiding gas to an exit duct 278 which is defined between the wall 267 and an outside shroud 279. This duct 278 is directed rearwardly so that gases escaping therefrom do not affect the steering of the aircraft. When the valve assembly 80 is rotated clockwise (as shown in broken lines) on its shaft 273, vane 274 reduces the entry area to the exit duct 278 and thereby throttles the flow of jet fluid. In this connection an extension 281 is constructed at the forward end of the opening 268 to shroud the forward end of vane 274 to prevent the escape of jet fluid in a forward direction. When the valve assembly 80 is turned counterclockwise, as viewed in FIG. 24 (to a position corresponding to the dotted line position of valve 82) the left edge of vane 274 will dip into the jet fluid stream and the vane will then divert jet fluid upwardly, causing a jet reaction tending to force the tail of the nozzle assembly and the tail of the craft in a downward direction. At the same time the vane 277 will throttle the exit duct 278, forcing a greater portion of the available jet fluid to flow over the top surface of the vane 274 of valve 80. Thus, the valve 80 is adjustable to discharge a jet stream wholly rearwardly through the duct 278 or to discharge all or a desired portion of the jet stream upwardly through the opening between the shrouds 279 and 281. In the latter situation, the upwardly ducted jet stream will be directed substantially 90° from the axis of the duct 54 to provide a maximum downward force upon the duct assembly. There may be additional vanes like and parallel to vanes 274 and 277 in the assembly to increase the effectiveness in turning the gas stream. The proportions of rearwardly and transversely directed gases are variable according to the position of the valve between its limits of movement.

As mentioned, the valve 82 is the same in construction as the valve 80 but may be turned to direct the jet stream downwardly from the opening 269, or to direct it rearwardly through a lower exit duct 282. The two valves 80 and 82 are manipulated jointly by the operating lever 78, the ends of which are connected by links 283 to arms 284 on the shafts 273 of the valves. These linkages are arranged so that when the operating arm 78 is in the mid position, both valves 80 and 82 discharge full gas flow rearwardly through the rearward exit ducts 278 and 282, respectively. When the arm 78 is turned in a counterclockwise direction in FIG. 24, the upper opening 268 is throttled partially or fully, depending upon the amount of adjustment, while the valve 82 over the opening 269 is moved toward its dotted line position to discharge gas downwardly. In similar fashion, if the arm 78 is moved clockwise, the lower opening 269 is throttled while the valve 80 in the upper opening 268 is positioned to discharge gas in an upward direction.

In FIG. 25 the lateral valves 58 and 60 are shown as being constructed similarly to the valves 80 and 82 but smaller in size and capacity. They, like the valves 80 and 82, are operated jointly and in opposite sense by linkages including an operating arm 65 shown also in FIG. 4. The smaller size of the lateral valves is dictated by the fact that yaw or directional control moments on the tail of the aircraft may be considerably smaller than the pitching control moments for adequate control so that a smaller portion of the jet gas is utilized for yaw control than for pitch control. The valve 60 is adjustable to direct jet fluid laterally to the right, as viewed in FIG. 23, through opening 271 or rearwardly through an exit duct 285. Similarly, the valve 58 is adjustable to direct jet gas leftwardly through opening 272 or rearwardly through a rearward exit duct 286.

The directional and pitching control for engine jet exhaust afforded by the novel structure in FIGS. 23, 24 and 25 is simple and effective to accomplish the purpose desired. However, considerable variation in structural detail is feasible while still coming within the scope of the invention.

Reference may now be made to FIG. 26 which shows an exemplary flight path pattern for the aircraft of the invention, with alternatives. At the left of the figure the aircraft is shown in the vertical take-off attitude with the propeller axes vertical for vertical rising, the rate of ascent being established by the excess of propeller axial thrust force over the take-off weight of the craft. Flight path 289 shows the aircraft attaining some desired altitude in vertical flight whereupon the propellors are gradually tilted forwardly or gimbaled to an attitude shown at 291. During this transition and in this attitude the propellers produce upward and horizontal thrust components causing the aircraft to maintain altitude due to the upward thrust force component and to move forwardly due to the horizontal thrust force component, accelerating to a moderate forward velocity. As forward velocity increases, the propellers are tilted or gimbaled gradually toward a horizontal axis position, to a position as shown at 292. Here, aircraft horizontal velocity, in conjunction with the lower gimbal angle and higher advance angle $\phi$, enables the development of a high value of propellor radial lift force to provide aircraft sustension, previously provided by the vertical component or propeller thrust which has gradually diminished as the propellers are gimbaled forwardly. As forward velocity increases further, there is a gradual assumption of some of the lift load by the small airfoils 32, if the same are used, and as the higher speeds are attained, lift is shared between the airfoils and propeller radial lift force, enabling the utilization of maximum propeller thrust to be applied for forward propulsion of the aircraft.

The aircraft as shown at 293 is in full horizontal flight with the propeller axes at a suitable angle A to the relative wind so that the craft may be sustained by propeller radial lift force or by a combination thereof with the lift afforded by small highly loaded airfoils of optimum design for cruising. When it is desired to land, the propeller is gimbaled or tilted gradually toward a vertical axis position whereby forward thrust is diminished and horizontal speed is reduced. As such propeller tilting proceeds, more and more of the weight of the aircraft is transferred from propeller radial lift force to the vertical component of propeller thrust. At 294 the aircraft has assumed the configuration for vertical let-down on propeller thrust, power being controlled to permit the aircraft to descend gradually at a desirable rate until landing is accomplished.

Path 296 is alternative to path 289 for take-off and descent and merely indicates that propeller swinging from the vertical axis position may be initiated during ascent so that forward velocity develops during ascent. Then, as the aircraft reaches the position shown at 293, it is in full horizontal flight and sustained by propeller radial force, supplemented, as air speed increases, by the airfoils. In similar fashion, let-down on the path 296 is accomplished by losing a forward air speed, tilting the propeller axes gradually upwardly to sustain the aircraft on propeller radial force and on the vertical component of propeller axial thrust while there is still substantial forward velocity. By suitable power adjustment, descent can begin so that as the aircraft follows the curved descent path, it would reach the vertical descent configuration at approximately 297 to allow for vertical landing. These flight paths 289 and 296 are susceptible of considerable variation and are shown merely as typical generalized examples for the purpose of clearer understanding of the invention.

Flight path 298 shows the situation in the event a power failure should occur during cruising flight. In this case, the aircraft would be flown in on the airfoils and on available propeller radial force due to propeller windmilling with the propeller axes nearly horizontal relative to the aircraft axis. At this time, windmilling of the propellers continues to develop radial lifting forces so that a normal landing can be attained. Just prior to landing, the aircraft can be flared out in the normal manner, at a landing speed in the range where propeller radial lift force and possibly some airfoil lift are effective.

FIG. 27 shows a diagram giving approximate relationships of stall and take-off speeds of simple wings in respect to their feasible wing loading. The average small personal aircraft utilizes a low wing loading of around forty pounds per square foot, whereupon the take-off speed may be in the neighborhood of ninety miles per hour and the stall speed is probably less than eighty miles per hour. This enables take-off and landing of such aircraft on airport runways which are reasonably short. If lower wing loadings are designed into the aircraft, lower take-off and stall speeds would be attained. In such aircraft, however, the wings are quite large and the aircraft are thus limited in their cruising and maximum speeds due to the large amount of drag created by the wings and the large amount of power required to drive them at high speed. For aircraft which are required to fly at higher velocities it is inherent that wings with higher $L/D$ and greater wing loading must be used and also that higher levels of take-off and stall speeds must be tolerable. Accordingly, commercial and military aircraft may be designed with take-off wing loads of eighty to one hundred pounds per square foot whereupon the take-off speed for such aircraft would range from one hundred ten miles per hour to well over one hundred twenty miles per hour. Runway requirements for such aircraft become considerable. Some jet aircraft have even higher take-off and landing speeds. With higher wing loadings prior known types of aircraft would be capable of attaining considerably higher cruising and maximum speeds but the stall and take-off speeds would become excessive. Considerable work has been done on underloading aircraft on take-off to enable take-off in a reasonable distance and at a reasonable speed, and in then superloading the aircraft when airborne with fuel, whereby the wing loading is drastically increased while the aircraft is flying at high speed. This technique enables nearer maximum utilization of wing capability.

These examples are cited simply to illustrate in a comparative way how, in the novel aircraft of the present invention, very small airfoils may be advantageously used to efficiently provide at least a part of aircraft lift when the aircraft is accelerated to a speed at which the small airfoils can become effective under highly loaded conditions. This necessary speed is attainable with this aircraft, since the same is sustained in the air, up to the speed at which airfoil lift is effective, by the utilization of the vertical component of propeller thrust for take-off and lift during the initial stages of transition and the horizontal component of propeller thrust for initial acceleration, and by the efficient utilization of propeller radial force as the major and dominant force for lift during the interval of intermediate flight speed after the vertical component of thrust has become small or negligible in value and before effective airfoil lift has developed to a significant level.

FIG. 28 is a comparative chart of approximate speed ranges for different types of aircraft, with respect to the kinds of lift applicable in different speed ranges. It should be realized that the speeds and legends are rough approximations merely to give a feel for the philosophy involved. The characteristics involved may vary over quite a large range depending upon the specifics of the aircraft. The top block in FIG. 28 represents the general characteristics of an aircraft embodying this invention wherein there are three sources of lift, namely $T_v$ (the vertical component of propeller axial thrust), $F_v$ (the vertical component of propeller radial force) and airfoil lift. As noted, at take-off and low speed the vertical component of thrust is depended upon to lift and sustain the aircraft. In the next speed range the preponderance of lift is divided between $T_v$ and $F_v$. In the third range, $F_v$ provides virtually all of the lifting force, while in the high speed range $F_v$ is supplemented by the airfoil to provide the required lift with maximum efficiency during the phase of maximum usage of the aircraft.

In the usual helicopter, $T_v$ is the sole source of aircraft lift and the top speed of such a vehicle is definitely limited to a moderate speed because of drag limitations which increase with speed. In other suggested types vertical take-off and landing aircraft comprising tiltable propellers and a large wing, none of which are as yet commercially successful, there are only two effective sources of lift, namely $T_v$ and wing lift. It is proposed that these developmental aircraft will take off vertically and accelerate to a moderate forward speed while only $T_v$ is active as a lifting force and, due to the low wing loading of wing used, lift begins to develop from the wing at a moderate forward or horizontal speed. Thus, an aircraft of the latter type has somewhat more favorable characteristics for horizontal speed than the helicopter, since at its maximum forward speed the craft is sustained by the wing, $T_v$ is small in value, and all of the power of the propellers is used for horizontal propulsion against the substantial drag of the wing. The large wing limits forward flight speed to a level far below that which can be obtained with an aircraft of comparable size and power embodying the present invention.

The last line on the chart (FIG. 28) shows the characteristics of a conventional airplane wherein the entire lift is at all times provided by a wing. Up to a reasonable forward velocity where wing lift becomes effective to support the craft, a conventional winged aircraft must accelerate on the ground, during which time effective wing lift is virtually nil. Upon attaining take-off speed the aircraft rises and may accelerate to the maximum speed which it is capable of attaining, depending upon its design, wing loading and power available. The dotted line between vertical heavy lines merely shows a range of take-off speed for various aircraft depending upon design configuration and wing loading.

This chart, insofar as the present invention is concerned, shows that a third means for obtaining aircraft lift is utilized in the present invention but is not utilized in any of the other types of aircraft. It should also be noted that the small airfoil in the aircraft of the invention need not necessarily be depended upon to provide lift since adequate lift may be furnished at all times either by the vertical component of propeller axial thrust or by propeller radial force. The small airfoil, because it is not necessary for vertical take-off, transition, and landing, may be designed for optimum efficiency and hence may be used to increase the high speed and cruising efficiency and performance of the aircraft.

The foregoing considerations show that a VTOL aircraft embodying this invention is capable not only of vertical rising and hovering at zero forward speed, but also of high subsonic horizontal velocity far in excess of that which other VTOL aircraft of the prior art can attain. In other words, the aircraft of this invention is capable of high-speed flight in the same order of magnitude as the speed of any conventional propeller driven winged aircraft.

An important advantage of the novel aircraft thus contemplated by this invention is that the same will fly stably and is easily controlled with the propellers in any gimbal angle position. Accordingly, transitions between vertical and horizontal flight may be made gradually, deliberately and safely. During a transition from one mode of flight to another, the vertical component of axial thrust and the radial lift force generated by the propeller change gradually and reciprocally in magnitude. Accordingly, these forces may replace each other as the transition progresses without changing the magnitude of the resultant of the two forces. The pilot is never forced to use some transitory dynamic phenomenon to attain transition from one mode of flight to another. An aircraft embodying the invention has flown consistently and with excellent results over a period of months, and the few new flying techniques required in handling the aircraft have been mastered by the pilot with relative ease.

To increase flight safety of the aircraft of this invention, it is preferable to use a plurality of power-plants, individually geared into the propeller drive system. While the drawings show a single turbine engine driving the propellers it is fully within the scope of this invention to utilize more than one engine. Thus, in case of the failure of one of the engines the other engine or engines will continue to develop power to drive the propellers for the development of radial lift force and axial thrust force. It is further within the scope of the invention to utilize different numbers and arrangements of propellers and airfoils.

The general advantages of an aircraft according to this invention have been detailed heretofore, but in general terms comprise vertical take-off and landing, transition from zero forward velocity to a high subsonic forward velocity for normal flight, capacity for very considerable payload without abnormal aircraft size or power requirements, and tolerable characteristics for emergency procedures such as power-off landings. Many of the features disclosed in connection with the aircraft of the invention comprise substantial deviations in order of magnitude from conventional practice, so that the interrelationship of the components and their cooperation in affording desired flight patterns attains a large order of magnitude difference from the prior art.

There is thus provided a novel and simplified VTOL type aircraft which has greater stability in flight and is easier to control under all conditions of flight than any prior known aircraft having comparable capabilities. The aircraft here provided is a commercially practical, high speed vertical rising and landing aircraft utilizing propellers especially designed to convert radial force into primary useful lift for the aircraft while at the same time producing propulsive thrust. An aircraft embodying the present invention may be designed for vertical take-off and landing as well as for high speed cruising at maximum efficiency during each mode of flight and hence, at maximum economy with minimum fuel consumption. For modern and normal office-to-office travel, this novel aircraft is faster and safer than modern jet powered craft which must use airport facilities with long runways. The novel features and mode of operation of the aircraft hereby provided make it possible to utilize a novel combination of optimized propeller blades and airfoils to attain maximum efficiency, economy and stability. The invention also contemplates a novelly constructed propeller which embodies simplified blade pitch control mechanism and blades designed to produce maximum radial lift force with minimum power absorption and, hence, without appreciably affecting the thrust forces generated at the same time. An aircraft constructed in accordance with the invention is capable of attaining a higher cruising speed with less power input than prior known types of craft. Simple and effective means are also provided for controlling and maintaining the attitude of the aircraft under all flight conditions of which the craft is capable. Effective and efficient means are also contemplated for both collectively and differentially controlling the blade pitch of a plurality of propellers, either manually or automatically in response to a selected mechanical function. The use of cyclic pitch changing rotors such as employed in helicopters is avoided. The aircraft of the invention is provided instead with fixed cyclic pitch propellers. By "fixed cyclic pitch propeller" as herein used is meant a propeller in which, except during a transient condition when the pitch of propeller blades is being adjusted, each blade has a fixed pitch during each revolution of the propeller, and that the blades are therefore not subject to cyclic variations at any time, not during hover of the aircraft, not during transition from hover to horizontal flight, nor in horizontal flight.

Although only a single embodiment of the invention is illustrated in the drawings and only a limited number of modifications thereof are described in the foregoing specification, it is to be expressly understood that the invention is not limited thereto. For example, the automatic control of propeller blade pitch may be made responsive to functions other than engine speed, such as to the gimbal angle of the propeller shafts so that blade pitch will change automatically and gradually during transition from one mode of flight to another. If desired as a further safety factor or otherwise, two or more propellers may be mounted on each side of the fuselage either abreast or in tandem at the same or different distances from the fuselage. Each such pair of oppositely located propellers may be driven by a separate power plant in the same manner as propellers 44, 44, or if desired, all of the propellers may be geared to one or several engines. In its broader aspects the invention also contemplates mounting a power plant or engine in each pivoted nacelle, the same being preferably suitably interconnected to insure joint or synchronous rotation of all of the propellers. Although each such pair of propellers should be subject to collective blade pitch control, only one pair need be subject to differential blade pitch adjustment for roll control in accordance with the foregoing description. Various other changes, including changes in the design and arrangement of parts illustrated, may also be made without departing from the spirit and scope of the invention as the same will now be understood by those skilled in the art.

What is claimed is:

1. An aircraft of the type adapted for vertical take-off and transition to horizontal flight while air-borne comprising power means, and a plurality of rotatable, fixed cyclic pitch propellers driven by said power means and mounted for pivotal movement between substantially axis vertical and nearly axis horizontal positions to accomplish transition from one mode of flight to another, means including a rigid oscillatable support extending from one propeller across the fuselage of the aircraft to another propeller for supporting said propellers, the blades of said propellers being constructed to simultaneously generate both radial forces which constitute a primary lifting force for sustaining the craft during forward flight and forward driving thrust for imparting forward velocity to the craft during at least a portion of said transition when the propellers are in a nearly horizontal axis position and at a positive angle to the relative wind.

2. An aircraft as defined in claim 1 comprising means including hydraulic actuating means for differentially adjusting the pitch of the blades of laterally spaced propellers for controlling the roll of the craft.

3. An aircraft of the type adapted for vertical take-off and transition to horizontal flight while airborne comprising power means, a plurality of rotatable propellers driven by said power means and mounted for pivotal movement between substantially axis vertical and nearly axis horizontal positions to accomplish transition from one mode of flight to another, the blades of said propellers being constructed to simultaneously generate both radial forces which constitute a primary lifting force for sustaining the craft during forward flight and forward driving thrust for imparting forward velocity to the craft during a least a portion of said transition when the propellers are in a nearly horizontal axis position and at a positive angle to the relative wind, a source continuously discharging gases under pressure, a duct directing the discharging gases rearwardly, adjustable valve controlled gas jets for selectively diverting said gases vertically and laterally from said duct to control the pitch and yaw of the craft during vertical flight, and an elevator and a rudder each coordinated with said valve controlled gas jets for controlling pitch and yaw of the craft during forward flight thereof.

4. An aircraft as defined in claim 3 wherein the source of gases under pressure comprises the exhaust of said power means.

5. An aircraft comprising a frame structure, a rotatable propeller supported at each side of said frame and comprising a propeller shaft mounted for pivotal movement about a first axis extending laterally from said frame and at substantially a right angle to the axis of rotation of the propeller shaft, the blades of said propellers having a fixed cyclic pitch in all positions of the propeller shafts, power means for rotating said propellers in unison, and means including a rigid unitary support oscillatable about said first axis and extending from one propeller to the other for pivoting said propeller shafts in unison about said first axis through an arc between at least a substantially vertical axis position and a nearly horizontal axis position, each of said propellers having blades constructed to generate a radial force which constitutes a primary lifting force to sustain the craft at altitude during forward flight with each propeller axis at a positive angle to the relative wind and to simultaneously generate thrust forces to impart forward velocity to the craft.

6. An aircraft as defined in claim 5 wherein the blades of said propellers are of streamlined airfoil shape in transverse section and have wide chords at the inner portions thereof to generate substantial radial lifting force when the propeller axis is at a small positive angle to the relative wind during forward flight and narrower chords at the tip portion to generate axial thrust.

7. An aircraft comprising a fuselage, rigid support means including a rigid member extending across and laterally from opposite sides of the fuselage and rotatably supported thereby, a propeller mounted on each lateral extension of said support, means for rotation about an axis substantially perpendicular to the axis of rotation of said support means, means for rotating said supoprt means to tilt the propeller axes between at least substantially vertical and nearly horizontal position, power means mounted in the fuselage and operatively connected to said propellers for driving the same in all positions of tilt, and means for adjusting the blade pitch of said propellers including rotatable motion transmitting gear means eccentrically carried by and rotatable independently of said support means.

8. An aircraft as defined in claim 7 comprising means for collectively adjusting the blade pitch of said propellers, and means for differentially adjusting the blade pitch of said propellers, said two last-named means comprising common differential gearing and motion transmitting mechanism including said motion transmitting gear means between said gearing and the propeller blades.

9. The method of operating an aircraft of the heavier than air type having a plurality of fixed cyclic pitch propellers each with an activity factor of at least 480, which method comprises the steps of utilizing axial thrust forces of propellers in a substantially vertical axis position to lift the craft vertically from the ground, utilizing a horizontal component of said axial thrust forces when the craft is airborne and the propeller axes are tilted forwardly toward a horizontal axis position to impart forward velocity to the craft while utilizing the vertical component of said axial thrust to sustain the craft in space, and utilizing the radial lift forces generated by said propellers as a major lifting force for the craft in combination with said vertical component of axial thrust to sustain the craft in space as the propeller axes approach a nearly horizontal position during forward flight of the craft.

10. The method of operating an aircraft as defined in claim 9 comprising the further steps of reversing the steps recited in said claim while reducing the power applied to the propellers to reduce the forward velocity of the craft and letting the same down in a substantially vertical path under the support of the axial thrust of the propellers with the shafts thereof in substantially vertical axis position.

11. The method of operating an aircraft as defined in claim 9 which includes supplementing said radial lift force of the propellers with lift forces generated by an airfoil as the craft attains additional forward velocity.

12. A vertical rising aircraft comprising a fuselage, oscillatable booms extending laterally therefrom, means rigidly connecting the adjacent ends of said booms within the fuselage, the outer end of each boom carrying a propeller shaft whose axis is substantially parallel to the fuselage plane of symmetry, means to oscillate said booms to swing said shafts coincidentally between substantially horizontal attitude and a substantially vertical attitude relative to the fuselage, a controllable pitch propeller mounted on each shaft at its forward end swingable with its shaft, means to drive said shafts and propellers in unison, pitch changing means for each propeller comprising internal-external gearing concentric with the axis of oscillation of said booms, control means in said fuselage connected to said pitch changing means, said control means being operable to change the pitch of said propellers in unison in the same direction, and means connected to said pitch changing means operable to change the pitch of said propellers differentially, and aircraft pitch and yaw control means at the after end of said fuselage.

13. In aircraft, a body having oscillatable booms extending laterally therefrom, each boom having a nacelle toward its outboard end, propeller driving means within each nacelle, a propeller mounted for rotation with each means, a powerplant between said nacelles drivably connected to each driving means, means to oscillate said booms and thereby tilt the axes of rotation of said propellers jointly from a position substantially parallel to the aircraft longitudinal axis to a position substantially parallel to the aircraft vertical axis, the blades of each said propeller being controllable in pitch, means to control collectively the pitch of all blades of said propellers for simultaneous and similar pitch change, differential means operable to control the pitch of the blades of one propeller to a different pitch angle than that of the blades of the other propeller, said two last-named means including common differential gearing, and means selectively operable to render said differential means effective and ineffective.

14. Aircraft according to claim 13 wherein said collective pitch control means comprises means to control powerplant rotational speed.

15. Aircraft according to claim 13 wherein said aircraft includes ailerons supported by said booms, a member manipulable for lateral control of the aircraft, operating connections from said member to said ailerons, and operating connections from said member to said differential means.

16. Aircraft according to claim 15 wherein said selectively operable means renders said differential means effective and ineffective while leaving said ailerons operable at all times.

17. Aircraft according to claim 13 wherein said aircraft includes an empennage having a rudder and a horizontal elevator thereon respectively for directional and longitudinal control during high-speed horizontal flight, a source of pressurized gas, a duct through which gases are continuously passed at high speed extending from said source to said empennage, adjustable nozzles on said empennage through which pressurized gas is selectively diverted in passing from said duct, adjusting connections from said nozzles, and operating connections to said rudder and elevator to which said adjusting connections are secured to produce adjustment of said nozzles in unison with movements of said rudder and elevator.

18. In aircraft, a body having a pair of small airfoils extending laterally in opposite directions therefrom, a powerplant in said body, jointly rotatable shafts driven by said powerplant and extending laterally from said body through said airfoils, a propeller comprising wide chord substantially rigid controllable pitch blades adjacent the tip of each airfoil, rigid unitary mounting means for said propellers, said mounting means being adjustable to tilt or swing the propeller axes between positions substantially parallel to the aircraft vertical axis and the aircraft longitudinal axis, means to drive said propellers from said jointly rotatable shafts, means operable to change the pitch angle of the blades of said propellers in unison, means operable to change the pitch angle of the blades of said propellers differentially, ailerons on said airfoils, means operable to change the incidence of said ailerons differentially, means coupling said two last-named operable means for joint and concurrent operation at least at positions of said propellers at which the shafts thereof are substantially tilted relative to the aircraft longitudinal axis, attitude control means enabling directional and longitudinal control when the propeller axes are substantially parallel to the aircraft vertical axis, and aerodynamic flap means for directional and longitudinal control when the propeller axes are substantially parallel to the aircraft longitudinal axis coordinated with said attitude control means.

19. An aircraft according to claim 18, including said tiltable propeller mounting means having connected thereto power means for effecting tilt, and means selectively operable by the aircraft crew to control the operation of said power means.

20. An aircraft according to claim 18, including said tiltable propeller mounting means having selectively operable power means to effect tilt, and a control device for said power means to control the amount and direction of tilt.

21. An aircraft according to claim 20, including said control device having means to afford continuous tilt movement between zero degrees and plus ninety degrees of tilt at a set rate, and to afford intermittent tilt movement at the set rate from any angle of available tilt to any other angle of available tilt.

22. The method of operating an aircraft having a plurality of fixed cyclic pitch propellers each with an activity factor of at least 480 and which are jointly tiltable in a fore-and-aft plane between a substantially axis vertical position and a substantially axis horizontal position, which method consists in taking off with the propellers in the axis vertical position, applying power to the propellers to develop axial thrust to raise the aircraft, tilting the propellers forwardly through a moderate angle while maintaining the power thereon to develop a forward component of thrust to accelerate the aircraft in a substantially horizontal direction, then tilting the propellers forwardly an additional amount so that their axes make an angle of from five to fifty degrees to the relative wind under which condition aircraft lift is provided by radial force developed by the propellers, said propellers also developing propulsive thrust, and continuing substantially horizontal flight of the aircraft at high speed with the propeller axes continuing to make an angle of five to ten degrees to the relative wind whereat they provide propulsive thrust and radial lift force to propel and sustain the aircraft, respectively.

23. The method according to claim 22, including the further landing procedure steps wherein the propellers are tilted upwardly to a greater angle while forward speed is reduced through power reduction, continuing sustention of the aircraft on propeller radial force, then tilting the propellers further upwardly to a substantially axis vertical position and reducing the power applied to the propellers to reduce the thrust thereof to let the aircraft down gradually.

24. In a convertible aircraft comprising booms extending laterally from the aircraft, each carrying a driven propeller, means rigidly connecting said booms, means to rotate said booms between positions wherein the propeller axes are substantially vertical and nearly horizontal, said means to rotate comprising a power unit selectively operable to rotate the booms in either direction, said power unit including control means to limit the rate of rotation of said booms to a preestablished maximum rate.

25. Aircraft according to claim 24 including a manually operable controller for said control means movable to select and to cause rotation of the booms from any tilt angle to any other tilt angle in the range of substantially zero to ninety degrees and to effect boom rotation completely through the tilt angle range without stopping, in either direction.

26. Aircraft according to claim 24 including a manually operable controller for said control means movable to select any boom tilt angle, said control means causing boom tilt angle to transit from an existing tilt angle to the tilt angle selected by said controller.

27. A vertical rising aircraft including a body and oscillatable booms extending laterally therefrom, power-driven rotating propellers mounted on the ends of said booms and tiltable, as the booms oscillate, between positions where the propeller axes are substantially parallel to the aircraft longitudinal axis and parallel to the aircraft vertical axis, said propellers being of fixed cyclic pitch and each comprising a plurality of wide-chord rigid blades variable in pitch angle, said propellers in the vertical axis attitude providing by their driven rotation full vertical thrust for sustaining, raising and lowering said aircraft in the atmosphere, said propellers as they are tilted between the axis vertical and axis horizontal positions providing components of thrust for forward propulsion and, from the vertical component of thrust providing lift force for substantially the entire sustention of the aircraft at relatively low air speeds, said propellers as they are tilted toward horizontal axis attitude making an angle with the relative wind substantially greater than five degrees and providing a major portion of aircraft lift from the vertical components of propeller radial force at horizontal flight speed of substantial amount, said aircraft including small fixed-incidence airfoils surrounding said booms to provide a fraction of the lift required for aircraft sustention at higher air speeds, the balance of the aircraft sustention being provided by propeller radial force.

28. A vertical rising aircraft according to claim 27 wherein said propellers rotate in opposite directions and, when in forwardly tilted attitude have those blades closest to the fuselage sweeping upwardly, and said small airfoils lying in the wake of said upwardly sweeping blades.

29. In an aircraft, a controllable pitch propeller comprising a hub having blade sockets therein, blades journalled in said sockets for pitch changing rotation, mechanism for selectively rotating said blades in their sockets, said blades comprising flattened airfoil sections having an extremely wide chord at their ends close to the hub, tapering to a narrow chord toward their tips, the wide chord portion being at least double the narrow chord portion, and said blades having an activity factor of at least one hundred sixty.

30. An aircraft for vertical lift and substantially horizontal airborne travel comprising a body having a driven propeller thereon, the attitude of said propeller relative to the vertical and horizontal being adjustable, said propeller comprising at least three blades of fixed cyclic pitch all mounted for pitch change in unison during flight, each blade being of streamline airfoil shape in section and having a very wide inboard chord, the outboard portion narrowing gradually to a relatively narrow chord at the tip, whereby high levels of static and dynamic thrust are developed during operation and whereby high levels of propeller radial lift force are developed during operation of the propeller with its axis angled acutely to the relative wind with the aircraft flying with substantial forward speed.

31. An aircraft for vertical lift and substantially horizontal airborne travel comprising a body having a driven propeller thereon mounted for swinging of the propeller axis in a fore-and-aft vertical plane relative to the aircraft axis while said propeller continues to be driven, said body including control devices for controlling its attitude, said propeller including at least three blades of fixed cyclic pitch all mounted for pitch change in unison during flight, each blade being of streamline airfoil shape in section and having a very wide inboard chord and a relatively narrow outboard chord, whereby high levels of static and dynamic thrust are developed during operation in any flight attitude and whereby high levels of propeller radial lift force are developed during operation of the propeller with its axis angled acutely to the relative wind and with the aircraft flying at substantial forward speed.

32. In aircraft comprising a body, a normally driven propeller thereon comprising at least three variable pitch blades, the axis of said propeller during aircraft forward flight normally having a small positive angle to the relative wind, a powerplant driving a one-way coupling, and said coupling driving said propeller, said propeller thus being able to continue rotation through windmilling upon non-operation of the powerplant, the blades of said propeller being of streamline airfoil shape in transverse section and having wide chords at their inboard portions and narrower chords at their tip portions to maximize aircraft lifting propeller radial force during propeller operation in both power-on and power-off flight.

33. An aircraft comprising a fuselage, rigid support means extending laterally from opposite sides of the fuselage and rotatably supported thereby, a propeller mounted on each lateral extension of said support means for rotation about an axis substantially perpendicular to the axis of rotation of said support means, means for rotating said support means to tilt the propeller axes between at least substantially vertical and nearly horizontal positions, power means operatively connected to said propellers for driving the same in all positions of tilt, means for collectively adjusting the blade pitch of said propellers, and means for differentially adjusting the blade pitch of said propellers, said two last-named means comprising common differential gearing and motion transmitting mechanism between said gearing and the propeller blades, said mechanism including rotatable motion transmitting means eccentrically carried by said support means and external-internal gearing concentric with the axis of rotation of said support means.

34. An aircraft comprising a fuselage, rigid support means extending laterally from the side of the fuselage and rotatably supported thereby, a propeller mounted on said support means for rotation about an axis substantially perpendicular to the axis of rotation of said support means, means for rotating said support means to tilt the propeller axis between at least substantially vertical and nearly horizontal positions, power means operatively connected to said propeller for driving the same in all positions of tilt, and means for adjusting the blade pitch of said propeller including rotatable motion transmitting means eccentrically carried by said support means and external-internal gearing concentric with the axis of rotation of said support means.

35. In an aircraft, a body having oscillatable booms extending laterally therefrom, each boom having a nacelle toward its outboard end, propeller driving means within each nacelle, a propeller mounted for rotation with each driving means, a power plant between said nacelles drivably connected to each driving means, means to oscillate said booms and thereby tilt the axes of rotation of said propellers jointly from a position substantially parallel to the aircraft longitudinal axis to a position substantially parallel to the aircraft vertical axis, the blades of each said propeller being controllable in pitch, means including apparatus to control power plant rotational speed to control collectively the pitch of all blades of said propellers for simultaneous and similar pitch change, differential means operable to control the pitch of the blades of one propeller to a different pitch angle than that of the blades of the other propeller, said last two means including common differential gearing, means selectively operable to render said differential means effective and ineffective, small fixed-incidence airfoils extending from the body and enclosing said booms, ailerons on said airfoils, and means to operate said ailerons coincidently with the selective operation of said differential means.

36. An aircraft comprising a frame structure, a rotatable propeller supported at each side of said frame and comprising a propeller shaft mounted for pivotal movement about a first axis extending laterally from said frame and at substantially a right angle to the axis of rotation of said shaft, the blades of said propellers being mounted for pitch adjustment, power means for rotating said propellers in unison, means for adjusting the blade pitch of both propellers in the same direction simultaneously, means for adjusting the blade pitch of the propellers in opposite directions simultaneously, said two last-named means comprising common differential gearing and motion transmitting mechanism including external-internal gearing concentric with said first axis, and means for pivoting said propeller shafts about said first axis through an arc between at least a substantially vertical axis position and a nearly horizontal axis position, each of said propellers having blades constructed to generate a radial force which constitutes a primary lifting force to sustain the craft at altitude during forward flight with each propeller axis at a positive angle to the relative wind and to simultaneously generate thrust forces to impart forward velocity to the craft.

37. An aircraft comprising a frame structure, a rotatable propeller supported at each side of said frame and comprising a propeller shaft mounted for pivotal movement about a first axis extending laterally from said frame and at substantially a right angle to the axis of rotation of said shaft, the blades of said propellers being mounted for pitch adjustment, power means for rotating said propellers in unison, means for adjusting the blade pitch of both propellers in the same direction simultaneously, means for adjusting the blade pitch of the propellers in opposite directions simultaneously, said two last-named means comprising common differential gearing and motion transmitting mechanism including external-internal gearing concentric with said first axis, and means for pivoting said propeller shafts about said first axis through an arc between at least a substantially vertical axis position and a nearly horizontal axis position.

38. Aircraft for vertical flight, horizontal flight and transition therebetween, comprising power means secured to the aircraft, a plurality of fixed cyclic pitch propellers each with an activity factor of at least 480 driven by said power means, means for tilting the axes of rotation of said propellers into substantially vertical positions for ascent and descent of the aircraft, into nearly horizontal positions wherein the propeller axes are at a positive angle to the relative wind for horizontal flight, and into positions between the substantially vertical and nearly horizontal positions to accomplish transition from one mode of flight to another, and small airfoil means secured to the aircraft which during horizontal flight develop substantially less than the required lifting force for maintaining the aircraft aloft, substantially the entire remaining portion of the said required lifting force being provided by the lifting components of radial forces developed by the propellers.

39. An aircraft of the type adapted for vertical take-off and transition to horizontal flight while airborne comprising power means, a pair of rotatable propellers driven by said power means and pivotally movable between substantially axis vertical and nearly axis horizontal positions during transition from one mode of flight to another, the blades of said propellers being constructed to simultaneously generate both radial forces which constitute a primary lifting force for sustaining the craft during forward flight and forward driving thrust for imparting forward velocity to the craft during at least a portion of said transition when the propellers are in a nearly horizontal axis position and at a positive angle to the relative wind, attitude control means enabling pitch and yaw control of the aircraft when the propeller axes are substantially vertical, said attitude control means including differentially operable thrust controlling elements, and an elevator and rudder coordinated with said differentially operable thrust controlling elements.

References Cited in the file of this patent

UNITED STATES PATENTS

| | | |
|---|---|---|
| 1,457,871 | Bonsiakos | June 5, 1923 |
| 1,951,817 | Blount | Mar. 20, 1934 |
| 2,213,497 | Kelly | Sept. 3, 1940 |
| 2,478,847 | Stuart | Aug. 9, 1949 |
| 2,650,045 | Hunt | Aug. 25, 1953 |
| 2,702,168 | Platt | Feb. 15, 1955 |
| 2,708,081 | Dobson | May 10, 1955 |
| 2,734,698 | Straayer | Feb. 14, 1956 |
| 2,738,148 | Stulen | Mar. 13, 1956 |
| 2,780,424 | Price | Feb. 5, 1957 |
| 2,814,451 | Turner et al. | Nov. 26, 1957 |
| 2,835,456 | Kaplan | May 20, 1958 |
| 2,934,153 | Chilman et al. | Apr. 26, 1960 |
| 2,954,831 | Scott | Aug. 4, 1960 |
| 2,961,189 | Doak | Nov. 22, 1960 |
| 2,991,026 | Nelson et al. | July 4, 1961 |